US012770238B2

(12) United States Patent
Narata et al.

(10) Patent No.: US 12,770,238 B2
(45) Date of Patent: Oct. 20, 2026

(54) AUTOMATIC SCREEN OPERATION TEST SUPPORT APPARATUS AND AUTOMATIC SCREEN OPERATION TEST SUPPORT METHOD

(71) Applicant: Hitachi, Ltd., Tokyo (JP)

(72) Inventors: Erika Narata, Tokyo (JP); Naoki Utsunomiya, Tokyo (JP); Shingo Katano, Tokyo (JP); Keisuke Fukumoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 18/825,922

(22) Filed: Sep. 5, 2024

(65) Prior Publication Data

US 2025/0308008 A1 Oct. 2, 2025

(30) Foreign Application Priority Data

Mar. 27, 2024 (JP) ................................ 2024-051691

(51) Int. Cl.
*G06T 7/00* (2017.01)

(52) U.S. Cl.
CPC .. *G06T 7/0002* (2013.01); *G06T 2207/20092* (2013.01)

(58) Field of Classification Search
CPC ......... G06T 7/0002; G06T 2207/20092; G06T 7/001
See application file for complete search history.

(56) References Cited

U.S. PATENT DOCUMENTS

| | | | | |
|---|---|---|---|---|
| 2012/0207397 | A1* | 8/2012 | Nagatomo | G06V 30/2504 382/218 |
| 2015/0082280 | A1* | 3/2015 | Betak | G06F 11/368 717/124 |
| 2017/0286160 | A1* | 10/2017 | Fujii | G06Q 30/0205 |
| 2019/0206047 | A1* | 7/2019 | Honda | G01N 21/8851 |
| 2020/0251032 | A1* | 8/2020 | Nakamura | G06F 11/2221 |
| 2022/0206935 | A1* | 6/2022 | Adachi | G06F 11/3684 |
| 2025/0117923 | A1* | 4/2025 | Kobayashi | H04L 9/3239 |

FOREIGN PATENT DOCUMENTS

| | | | |
|---|---|---|---|
| JP | 2001-282578 | A | 10/2001 |
| JP | 2020-52861 | A | 4/2020 |

* cited by examiner

*Primary Examiner* — Van D Huynh
(74) *Attorney, Agent, or Firm* — Procopio, Cory, Hargreaves & Savitch LLP

(57) ABSTRACT

Provided are an automatic screen operation test support apparatus and an automatic screen operation test support method capable of extracting a problematic defect difference in an automatic screen operation test of a screen system without requiring manual work. The automatic screen operation test support apparatus executes non-defect list creation processing of recording, in a non-defect difference information table, a difference between captured screens caused by executing an automatic screen operation test a plurality of times on the same screen system. The automatic screen operation test support apparatus executes defect difference checking processing of specifying a non-defect difference by excluding a non-defect difference from differences between captured screens caused by executing the automatic screen operation test on a comparison reference screen system and a comparison target screen system.

15 Claims, 40 Drawing Sheets

[FIG. 1]
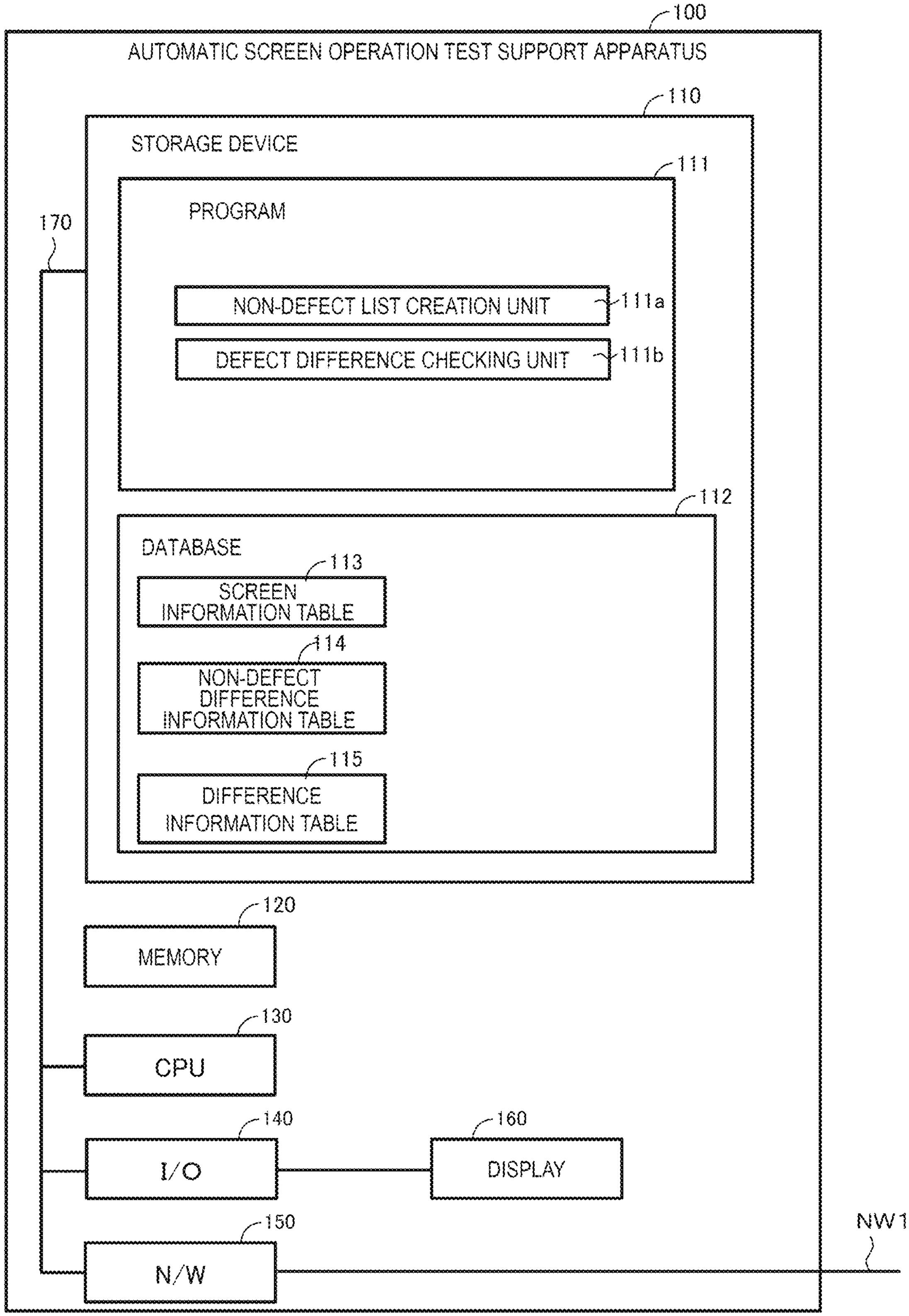

[FIG. 2]

113

| SCREEN ID (113a) | SCENARIO ID (113b) | STEP NUMBER (113c) |
|---|---|---|
| 00001 | 00001 | 00001 |
| 0002 | 00001 | 00002 |
| .... | . . . | . . . . |
| 00025 | 00001 | 00025 |
| .... | . . . | . . . . |

[FIG. 3]

114

| ID (114a) | SCREEN INFORMATION ID (114b) | COORDINATE INFORMATION (114c) | CONTENT TYPE (114d) | DIFFERENCE TYPE (114e) | DIFFERENCE CONTENT ID (114f) | ORIGINAL CONTENT (114g) | CONTENT DURING EXECUTION (114h) | NUMBER OF OCCURRENCE (114i) |
|---|---|---|---|---|---|---|---|---|
| 00001 | 00025 | (x1, y1) | DATE | CONTENT | 000001 | 2023/9/21 (THURSDAY) 15:35:00 | 2023/9/21 (THURSDAY) 16:12:10 2023/9/21 (THURSDAY) 17:00:00 ... | 10 |
| 00002 | 00025 | (x2, y2) | IMAGE | SIZE | 000002 | 198 × 245 | 216 × 32 ... | 4 |
| 00003 | 00025 | (x2, y2) | IMAGE | COLOR | 000002 | R:100,G:95, B:55 | R:100,G:94, B:32 ... | 4 |
| 00004 | 00025 | (x3, y3) | DATE | CONTENT | 000003 | 2023/9/27 (THURSDAY) MORNING | 2023/9/28 (FRIDAY) MORNING | 1 |

[FIG. 4]

| ID | SCREEN INFORMATION ID | COORDINATE INFORMATION | CONTENT TYPE | DIFFERENCE TYPE | ORIGINAL CONTENT | CONTENT DURING EXECUTION | NON-DEFECT DIFFERENCE INFORMATION ID | DEFECT |
|---|---|---|---|---|---|---|---|---|
| 00001 | 00025 | (x1, y1) | DATE | CONTENT | 2023/9/21 (THURSDAY) 15:35:00 | 2023/9/21 (THURSDAY) 17:00:00 | 000001 | 0 |
| 00002 | 00025 | (x2, y2) | IMAGE | SIZE | 198 × 245 | 216 × 32 | 000002 | 0 |
| 00003 | 00025 | (x2, y2) | IMAGE | COLOR | R:100,G:95, B:55 | R:100,G:94, B:32 | 000003 | 0 |
| 00004 | 00025 | (x3, y3) | DATE | CONTENT | 2023/9/27 (THURSDAY) MORNING | DATE CANNOT BE ACQUIRED. | — | 1 |
| 00005 | 00025 | (x4, y4) | IMAGE | SIZE | 198 × 245 | null | — | 1 |
| 00006 | 00025 | (x4, y4) | IMAGE | COLOR | R:100,G:95, B:55 | R:0,G:0, B:0 | — | 1 |

[FIG. 5]
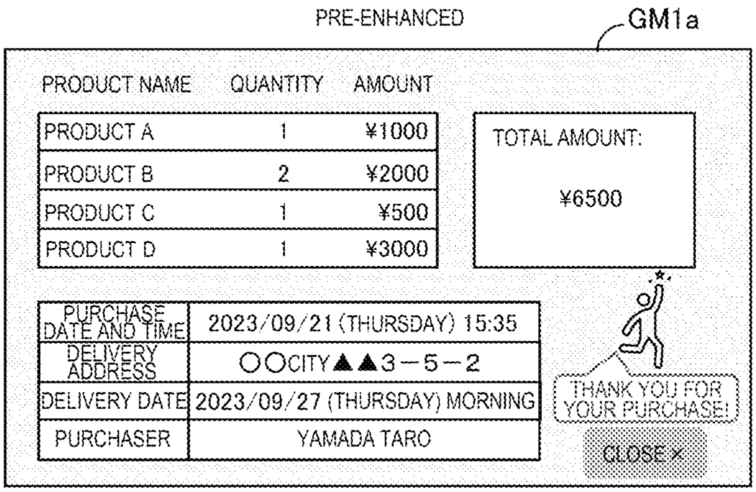
[FIG. 6]
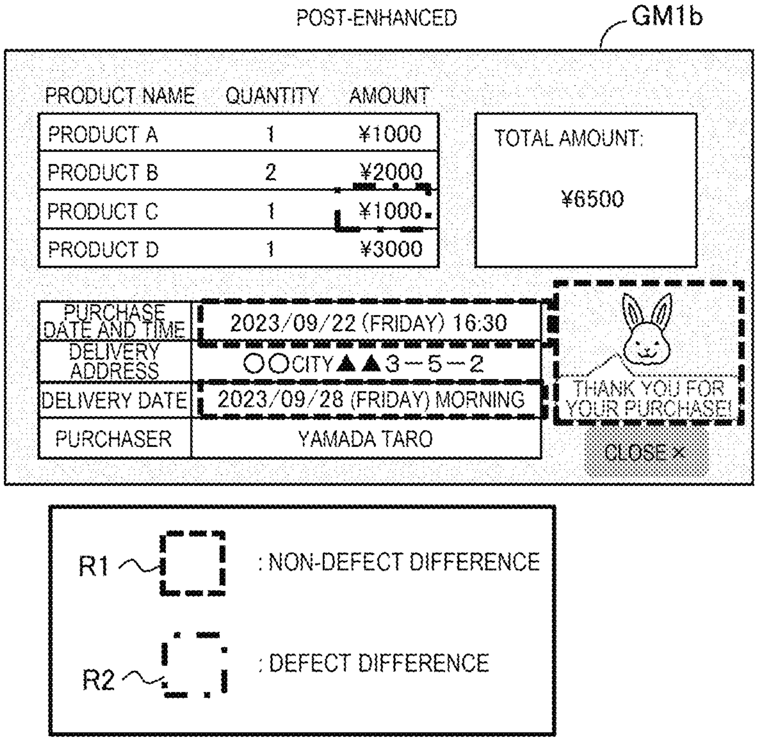

[FIG. 7A]
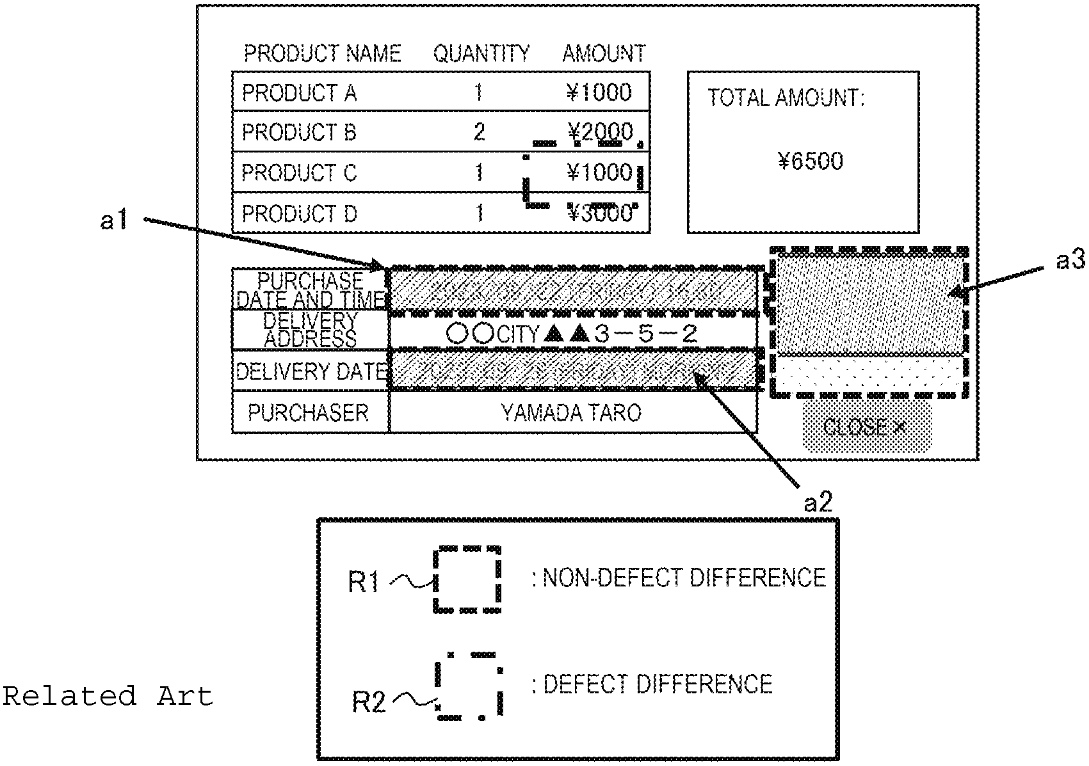
Related Art
[FIG. 7B]
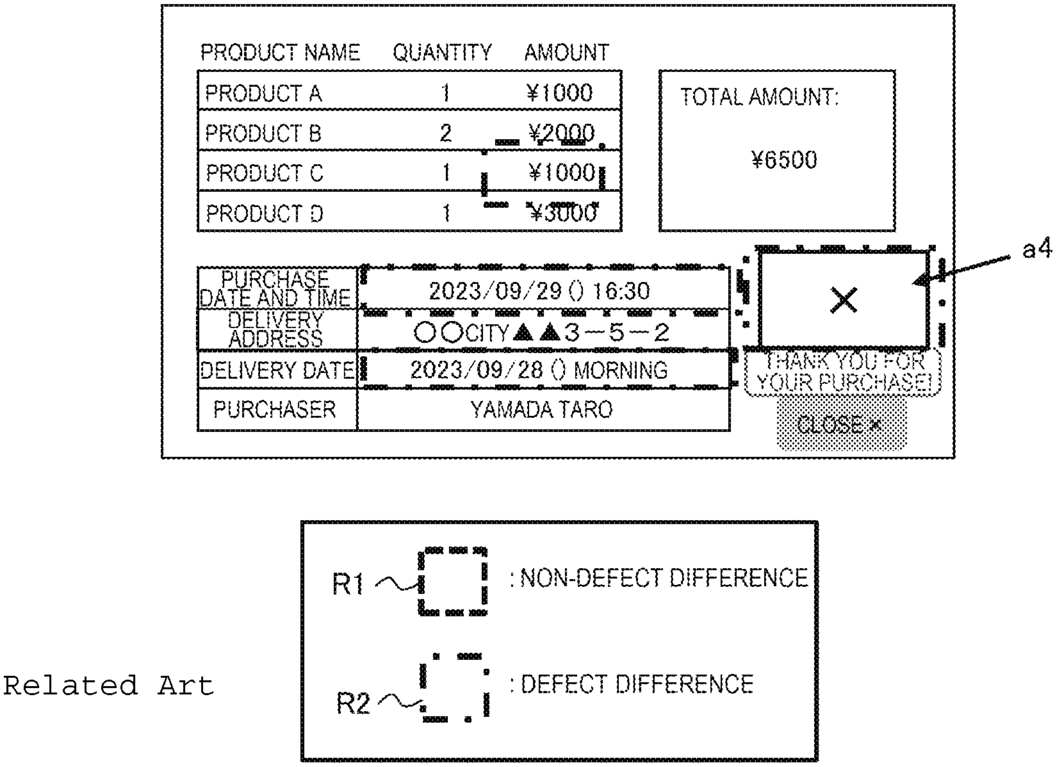
Related Art

[FIG. 8A]
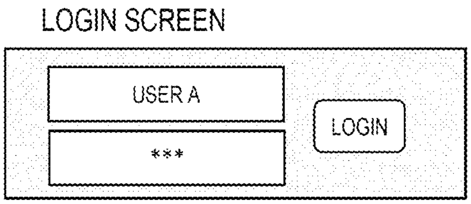
[FIG. 8B]
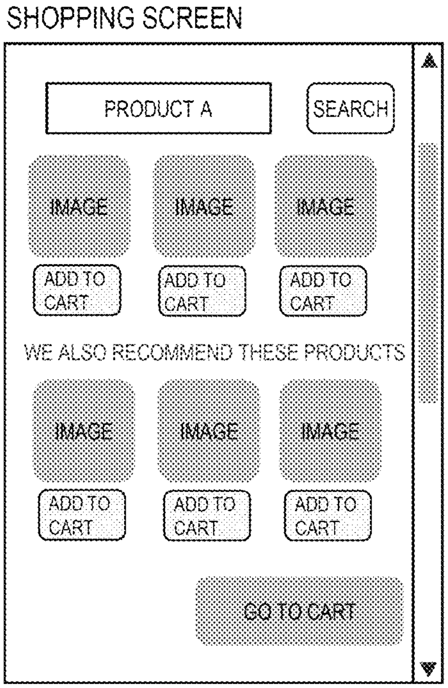

[FIG. 8C]
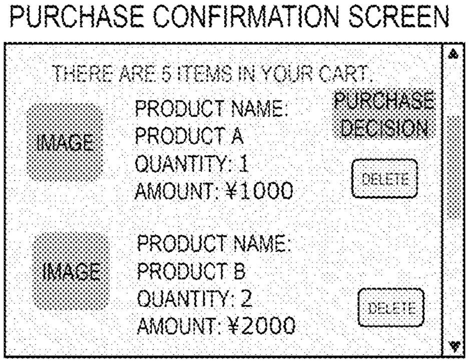
[FIG. 8D]
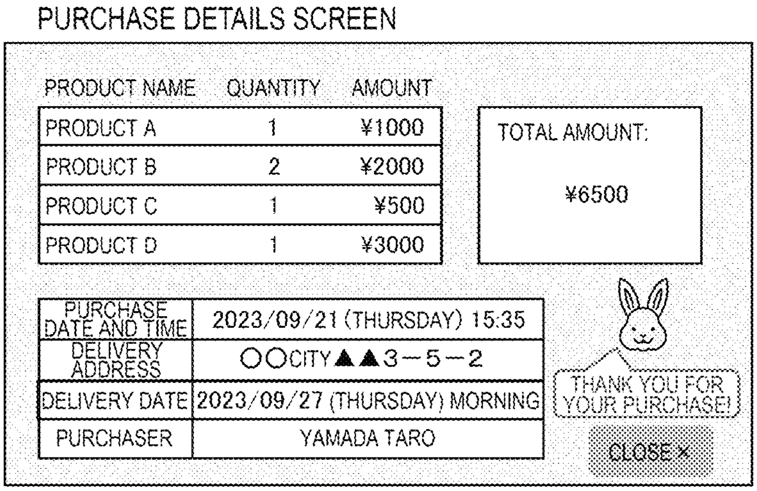

[FIG. 9A]
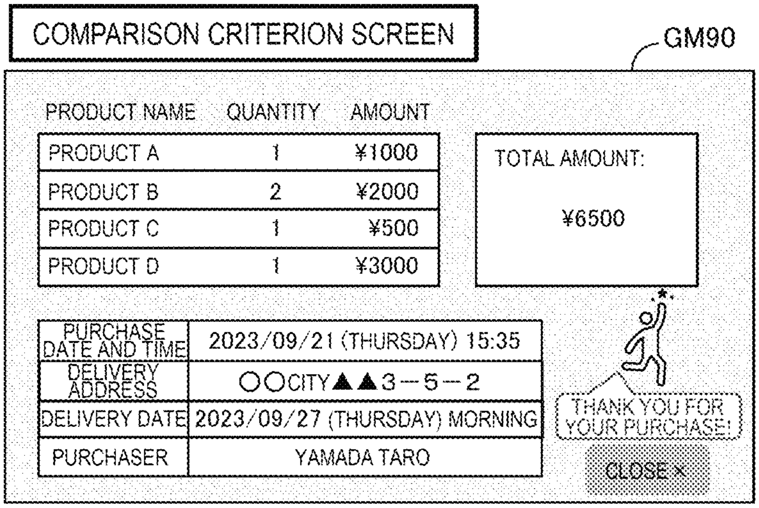
[FIG. 9B]
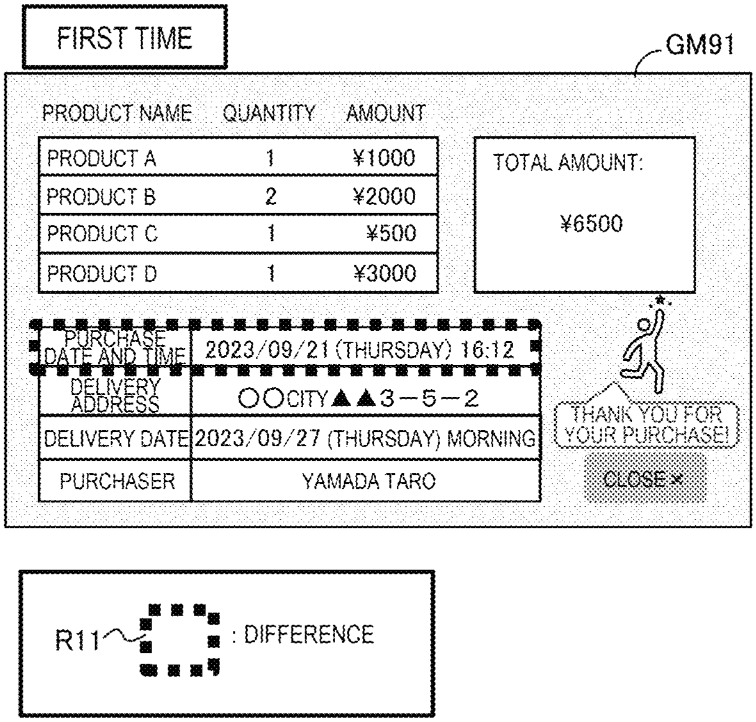

[FIG. 9C]
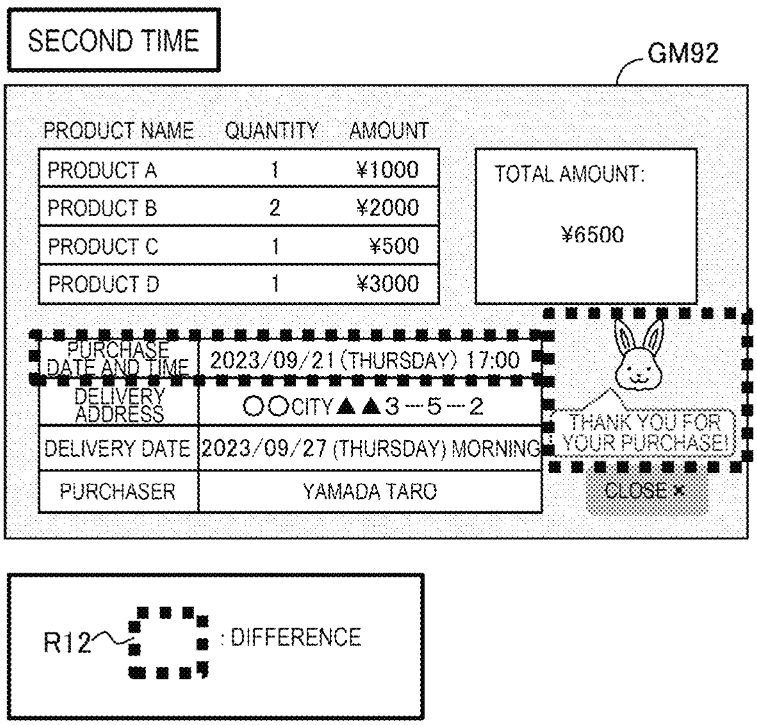
[FIG. 9D]
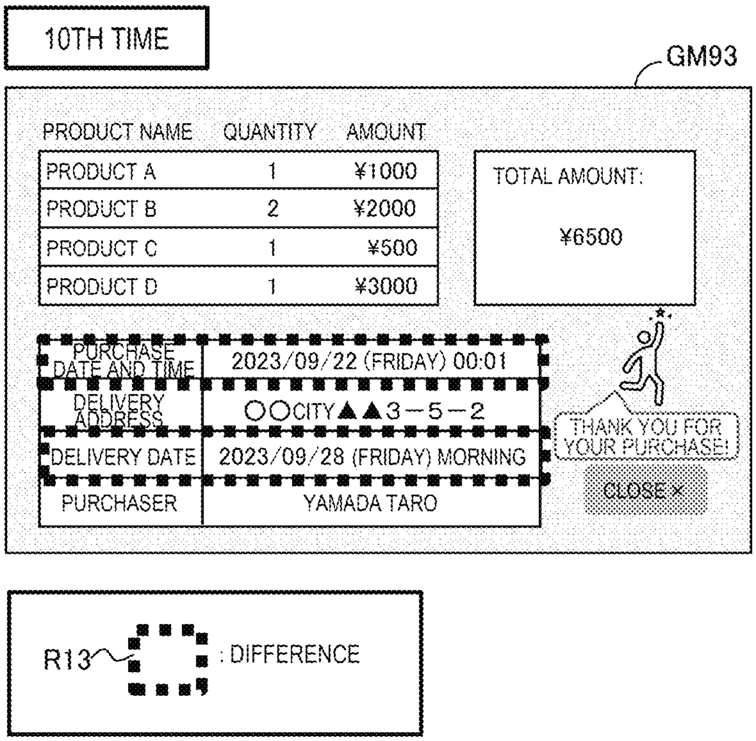

[FIG. 10A]
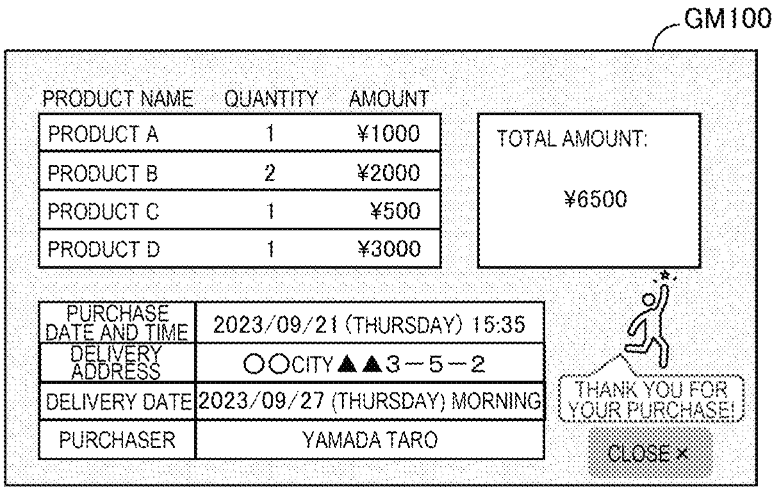
[FIG. 10B]
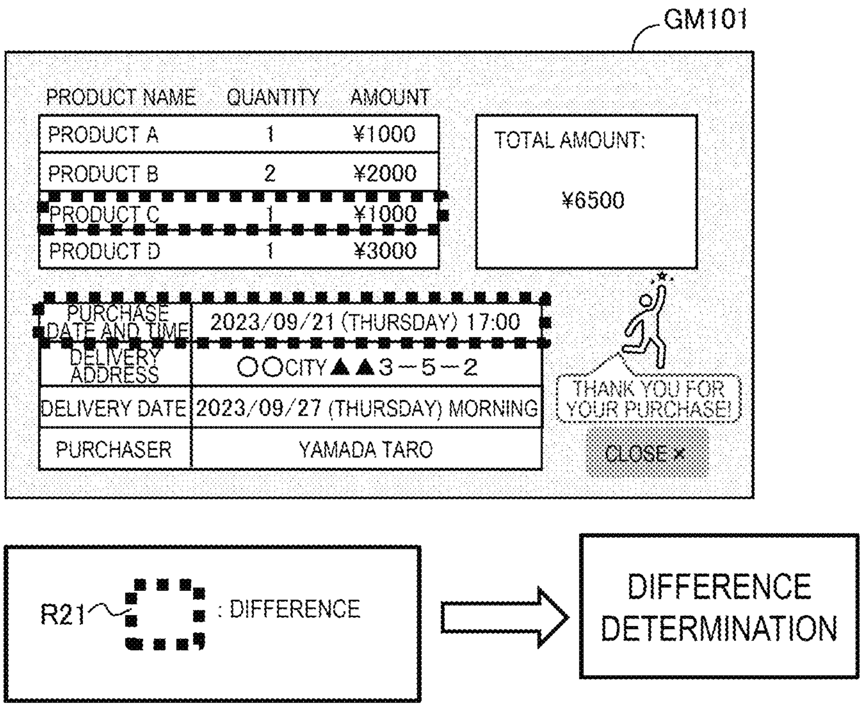

[FIG. 10C]
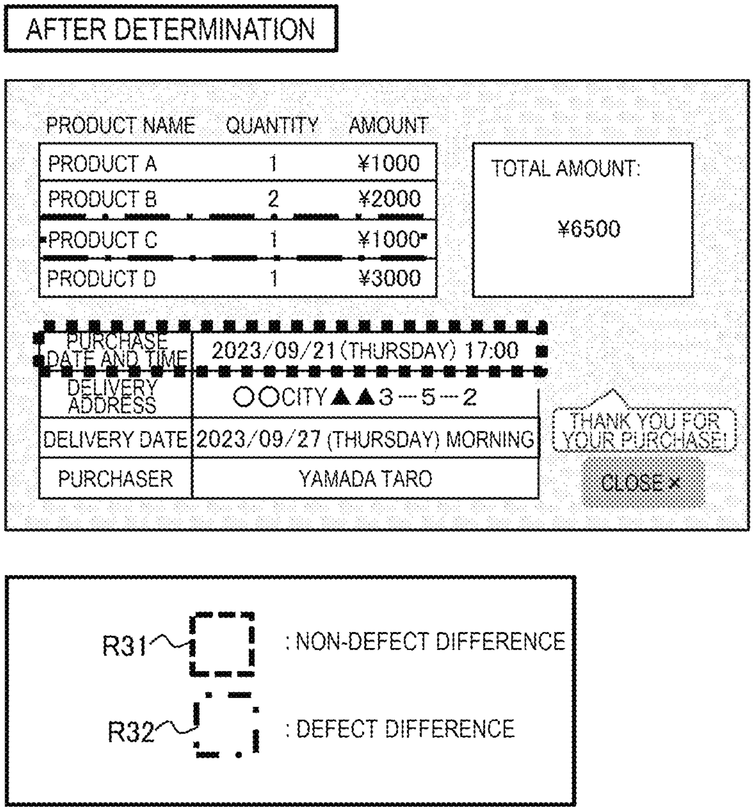

[FIG. 11]
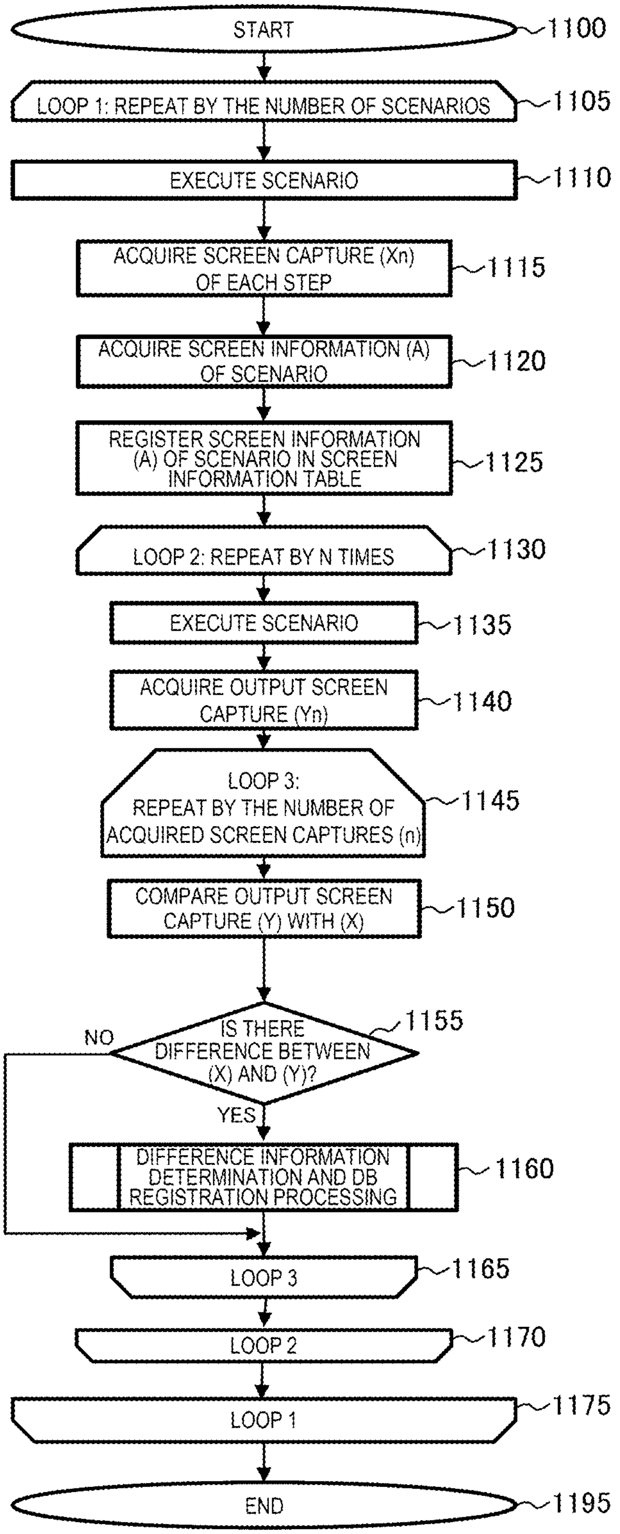

[FIG. 12]
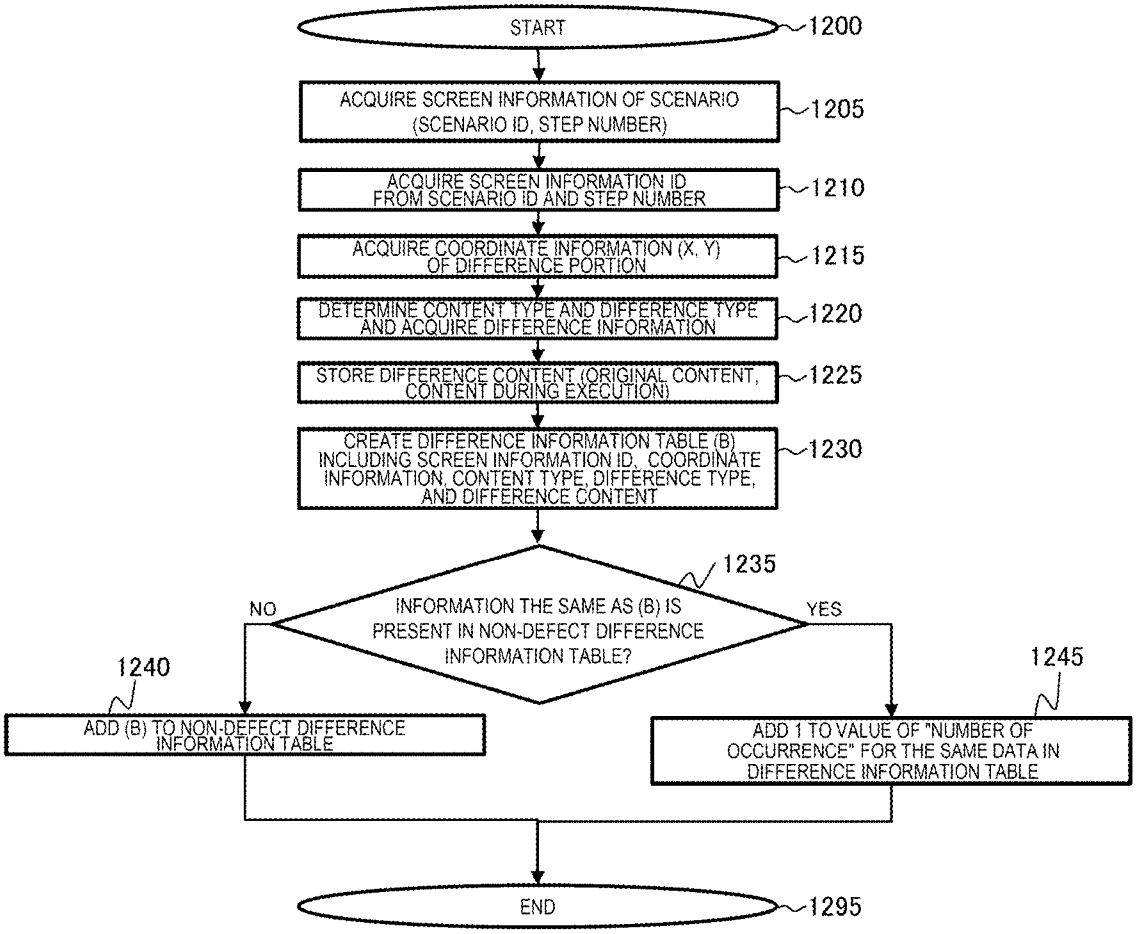

[FIG. 13]
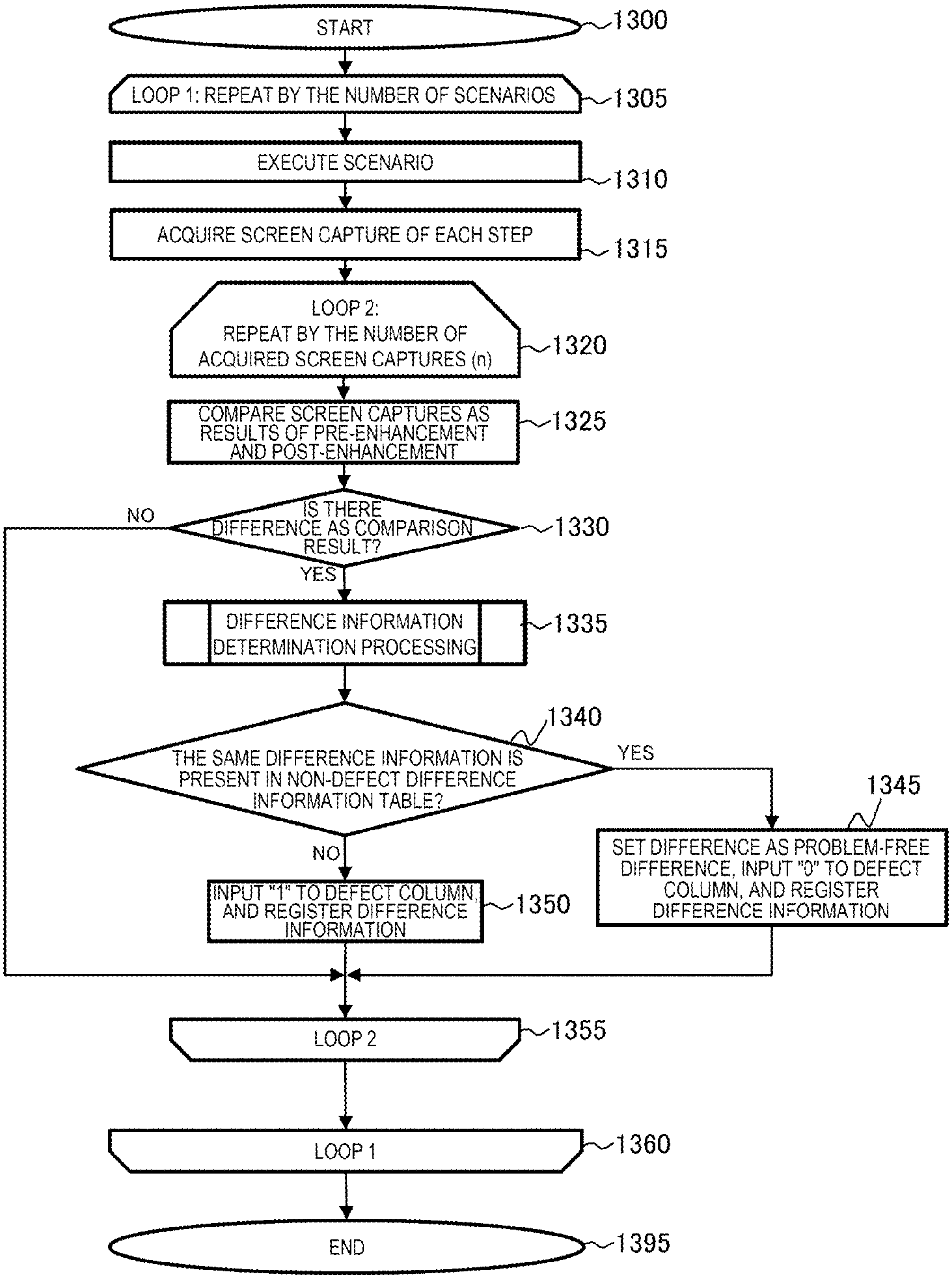

[FIG. 14]
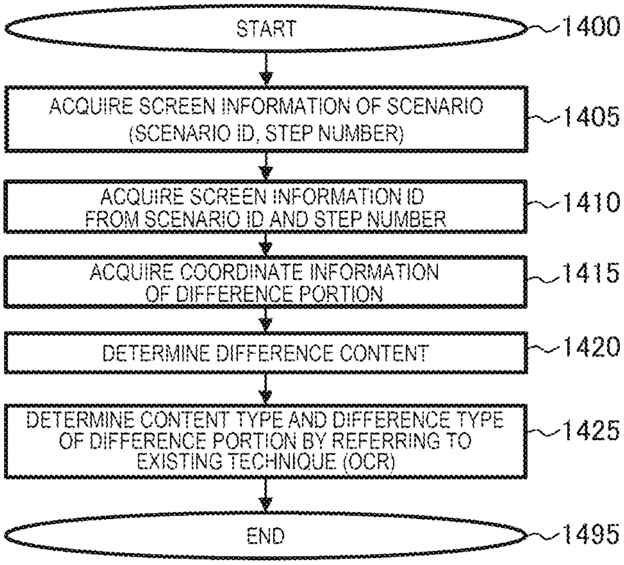

[FIG. 15]

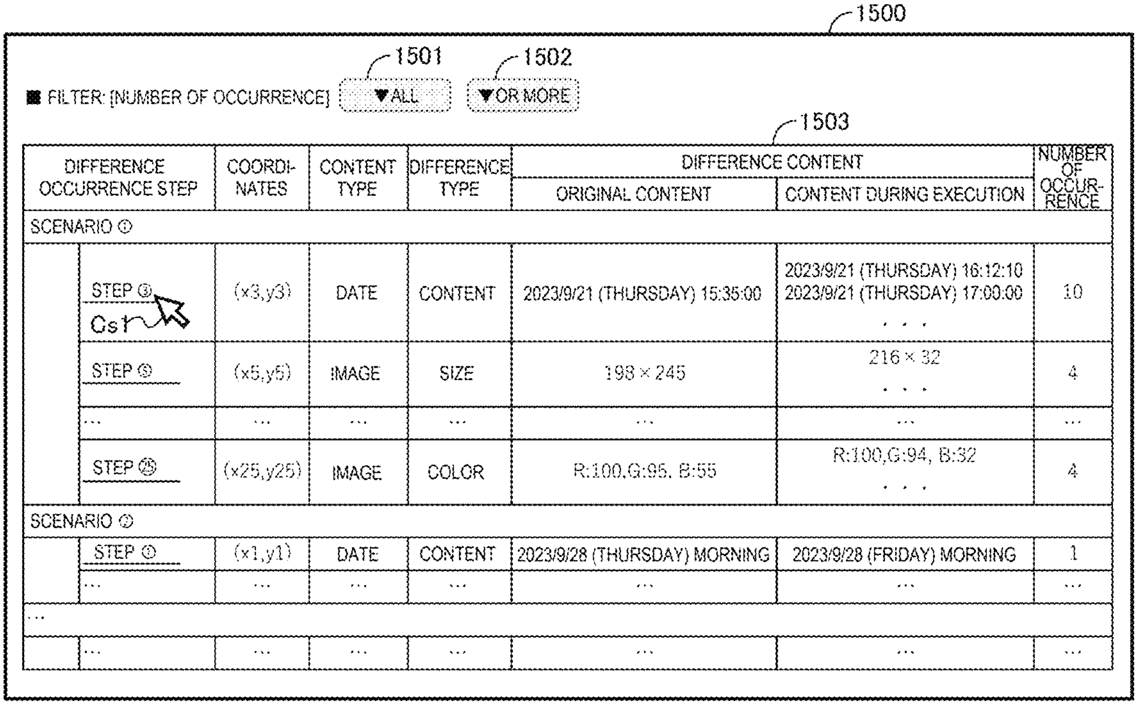

| DIFFERENCE OCCURRENCE STEP | | COORDINATES | CONTENT TYPE | DIFFERENCE TYPE | DIFFERENCE CONTENT | | NUMBER OF OCCURRENCE |
|---|---|---|---|---|---|---|---|
| | | | | | ORIGINAL CONTENT | CONTENT DURING EXECUTION | |
| SCENARIO ① | | | | | | | |
| | STEP ③ | (x3,y3) | DATE | CONTENT | 2023/9/21 (THURSDAY) 15:35:00 | 2023/9/21 (THURSDAY) 16:12:10<br>2023/9/21 (THURSDAY) 17:00:00<br>. . . | 10 |
| | STEP ⑤ | (x5,y5) | IMAGE | SIZE | 198 × 245 | 216 × 32<br>. . . | 4 |
| | ... | ... | ... | ... | ... | ... | ... |
| | STEP ㉕ | (x25,y25) | IMAGE | COLOR | R:100,G:95, B:55 | R:100,G:94, B:32<br>. . . | 4 |
| SCENARIO ② | | | | | | | |
| | STEP ① | (x1,y1) | DATE | CONTENT | 2023/9/28 (THURSDAY) MORNING | 2023/9/28 (FRIDAY) MORNING | 1 |
| | ... | ... | ... | ... | ... | ... | ... |
| ... | | | | | | | |
| | ... | ... | ... | ... | ... | ... | ... |

[FIG. 16]
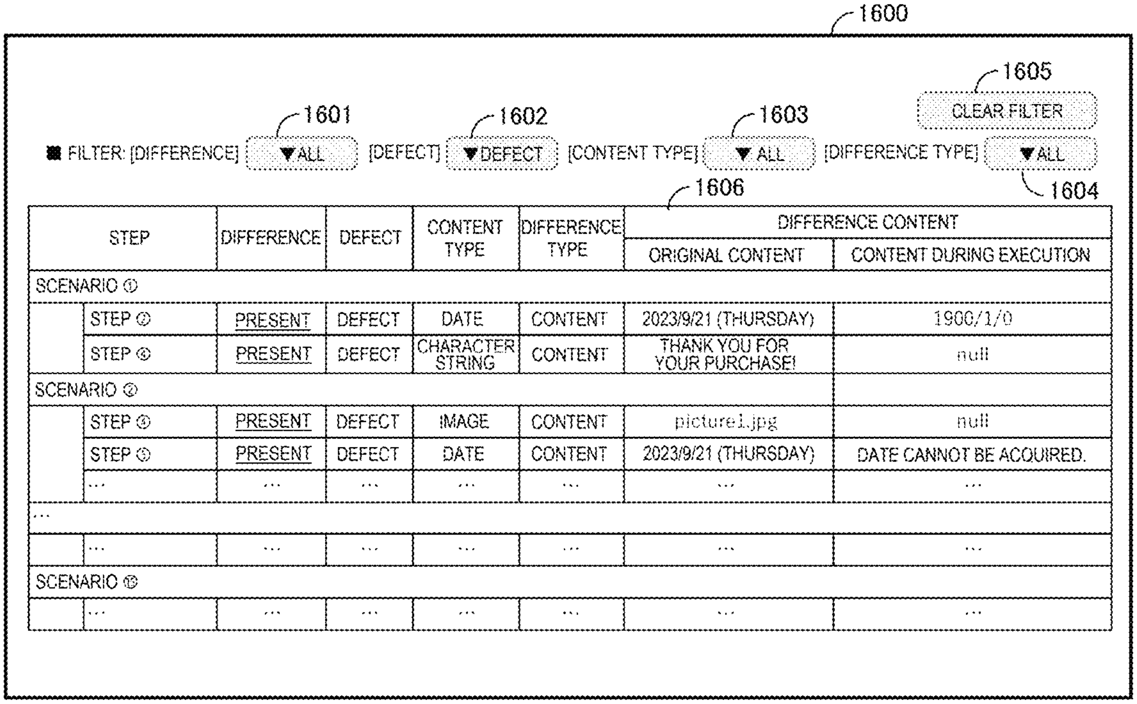

[FIG. 17]
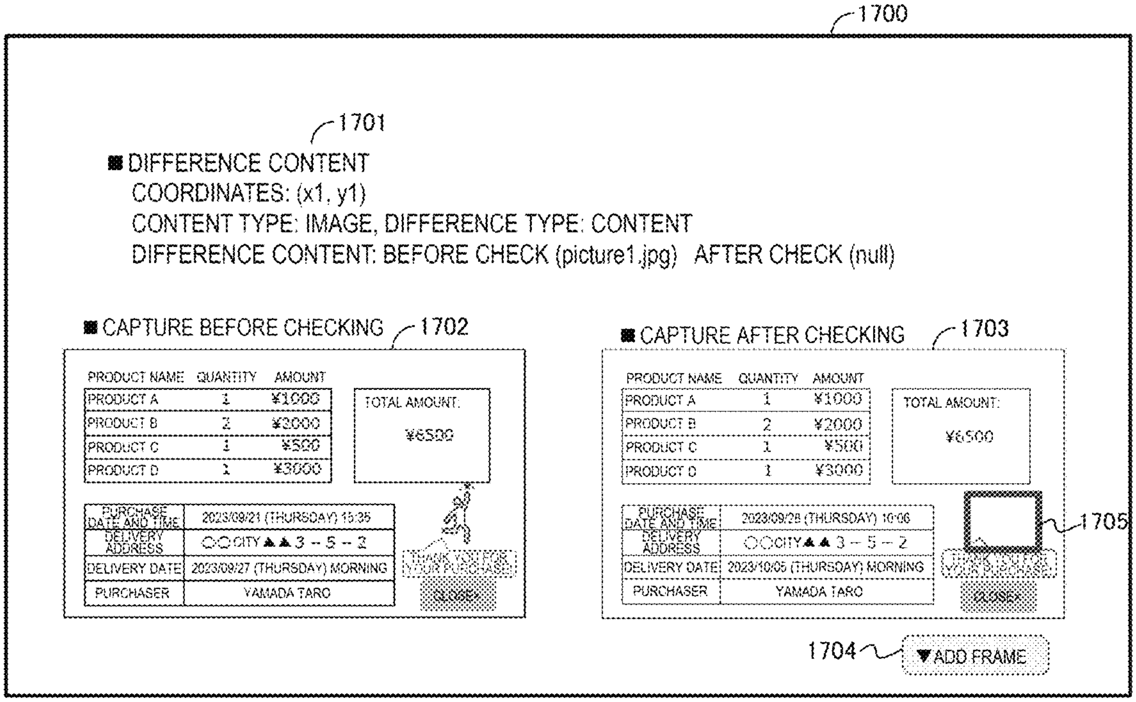

[FIG. 18]

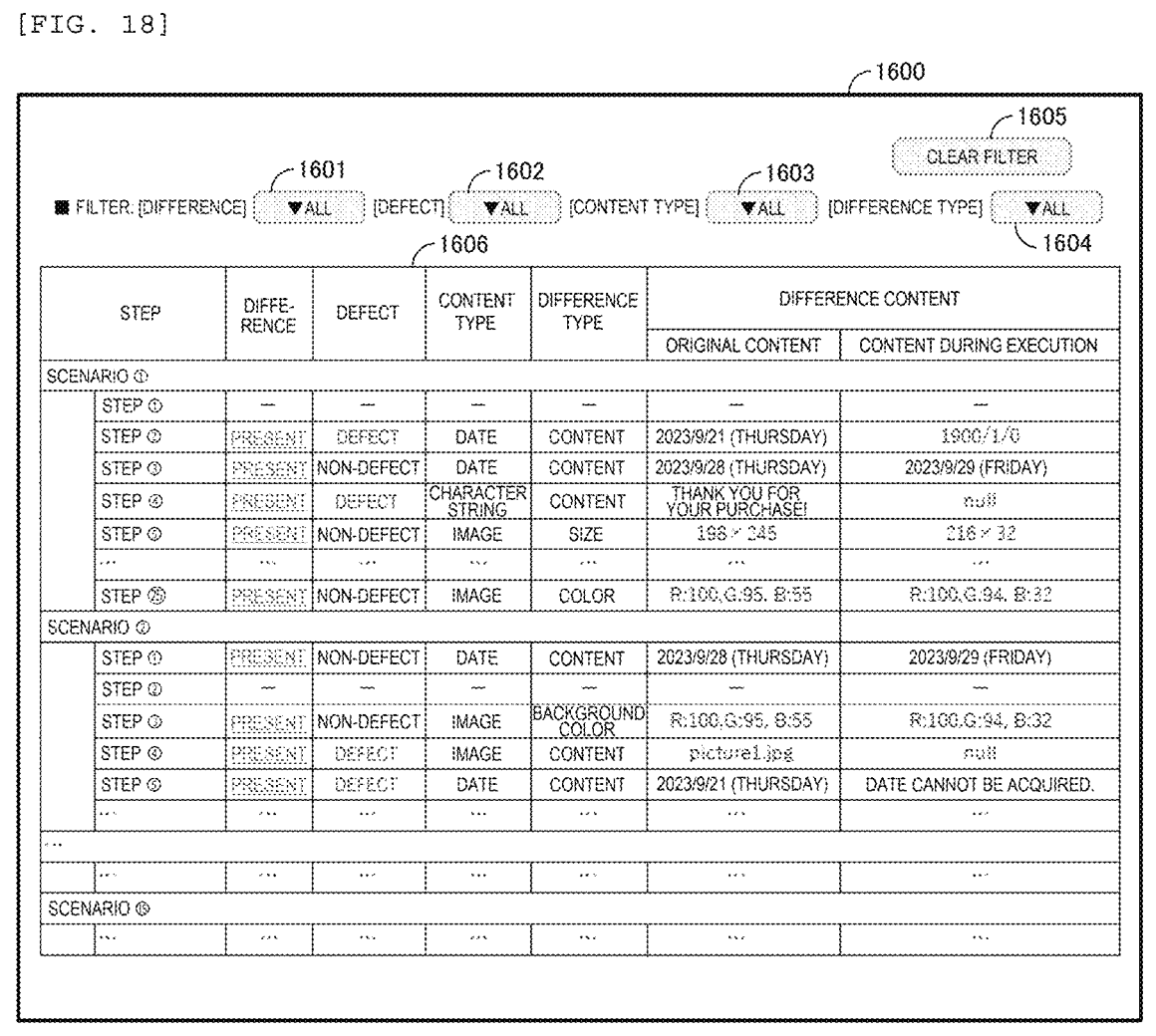

1600

1605 CLEAR FILTER

■ FILTER: [DIFFERENCE] ▼ALL (1601) [DEFECT] ▼ALL (1602) [CONTENT TYPE] ▼ALL (1603) [DIFFERENCE TYPE] ▼ALL (1604)

1606

| STEP | | DIFFE-RENCE | DEFECT | CONTENT TYPE | DIFFERENCE TYPE | DIFFERENCE CONTENT | |
|---|---|---|---|---|---|---|---|
| | | | | | | ORIGINAL CONTENT | CONTENT DURING EXECUTION |
| SCENARIO ① | | | | | | | |
| | STEP ① | — | — | — | — | — | — |
| | STEP ② | PRESENT | DEFECT | DATE | CONTENT | 2023/9/21 (THURSDAY) | 1900/1/0 |
| | STEP ③ | PRESENT | NON-DEFECT | DATE | CONTENT | 2023/9/28 (THURSDAY) | 2023/9/29 (FRIDAY) |
| | STEP ④ | PRESENT | DEFECT | CHARACTER STRING | CONTENT | THANK YOU FOR YOUR PURCHASE! | null |
| | STEP ⑤ | PRESENT | NON-DEFECT | IMAGE | SIZE | 198 × 245 | 216 × 32 |
| | ... | ... | ... | ... | ... | ... | ... |
| | STEP ㉕ | PRESENT | NON-DEFECT | IMAGE | COLOR | R:100, G:95, B:55 | R:100, G:94, B:32 |
| SCENARIO ② | | | | | | | |
| | STEP ① | PRESENT | NON-DEFECT | DATE | CONTENT | 2023/9/28 (THURSDAY) | 2023/9/29 (FRIDAY) |
| | STEP ② | — | — | — | — | — | — |
| | STEP ③ | PRESENT | NON-DEFECT | IMAGE | BACKGROUND COLOR | R:100, G:95, B:55 | R:100, G:94, B:32 |
| | STEP ④ | PRESENT | DEFECT | IMAGE | CONTENT | picture1.jpg | null |
| | STEP ⑤ | PRESENT | DEFECT | DATE | CONTENT | 2023/9/21 (THURSDAY) | DATE CANNOT BE ACQUIRED. |
| | ... | ... | ... | ... | ... | ... | ... |
| ... | | | | | | | |
| | ... | ... | ... | ... | ... | ... | ... |
| SCENARIO ⑮ | | | | | | | |
| | ... | ... | ... | ... | ... | ... | ... |

[FIG. 19]

114

| ID (114a) | SCREEN INFORMATION ID (114b) | COORDINATE INFORMATION (114c) | CONTENT TYPE (114d) | DIFFERENCE TYPE (114e) | DIFFERENCE CONTENT ID (114f) | ORIGINAL CONTENT (114g) | CONTENT DURING EXECUTION (114h) | NUMBER OF OCCURRENCE (114i) | THRESHOLD FLAG (114j) |
|---|---|---|---|---|---|---|---|---|---|
| 00001 | 00025 | (x1, y1) | DATE | CONTENT | 000001 | 2023/9/21 (THURSDAY) 15:35:00 | 2023/9/21 (THURSDAY) 16:12:10<br>2023/9/21 (THURSDAY) 17:00:00<br>... | 10 | 0 |
| 00002 | 00025 | (x2, y2) | IMAGE | SIZE | 000002 | 198 × 245 | 216 × 32<br>... | 4 | 0 |
| 00003 | 00025 | (x2, y2) | IMAGE | COLOR | 000002 | R:100,G:95, B:55 | R:100,G:94, B:32<br>... | 4 | 0 |
| 00004 | 00025 | (x3, y3) | DATE | CONTENT | 000003 | 2023/9/27 (THURSDAY) MORNING | 2023/9/28 (FRIDAY) MORNING | 1 | 1 |

[FIG. 20]
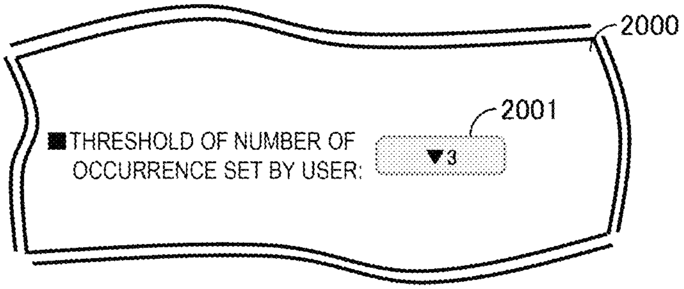

[FIG. 21]
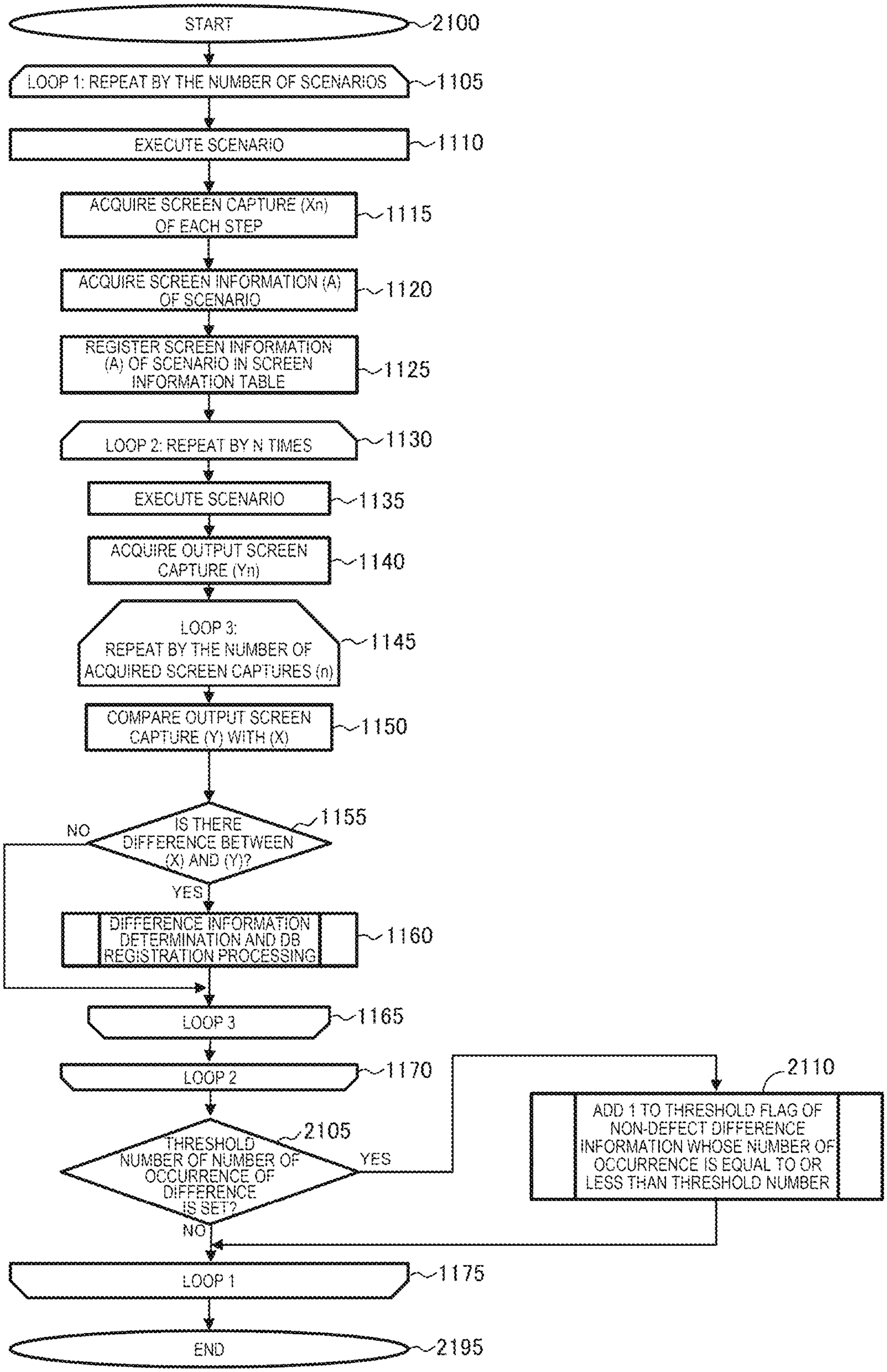

[FIG. 22]

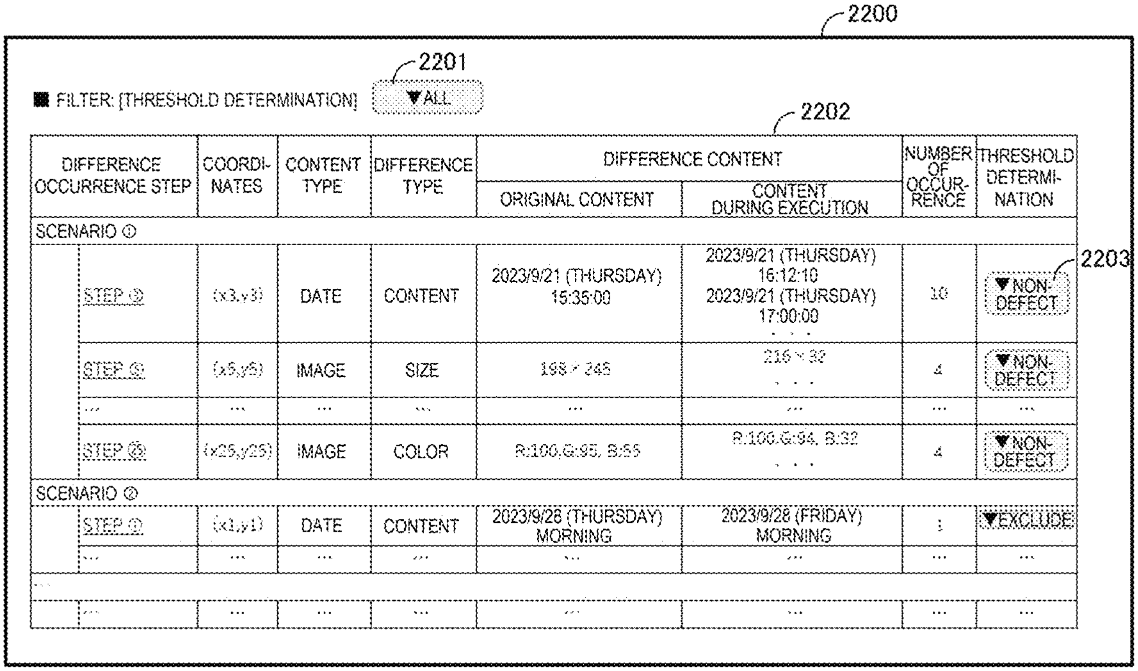

| DIFFERENCE OCCURRENCE STEP | | COORDINATES | CONTENT TYPE | DIFFERENCE TYPE | DIFFERENCE CONTENT | | NUMBER OF OCCURRENCE | THRESHOLD DETERMINATION |
|---|---|---|---|---|---|---|---|---|
| | | | | | ORIGINAL CONTENT | CONTENT DURING EXECUTION | | |
| SCENARIO ① | | | | | | | | |
| | STEP ③ | (x3,y3) | DATE | CONTENT | 2023/9/21 (THURSDAY) 15:35:00 | 2023/9/21 (THURSDAY) 16:12:10 2023/9/21 (THURSDAY) 17:00:00 . . . | 10 | ▼NON-DEFECT |
| | STEP ⑤ | (x5,y5) | IMAGE | SIZE | 198 × 245 | 216 × 32 . . . | 4 | ▼NON-DEFECT |
| | ... | ... | ... | ... | ... | ... | ... | ... |
| | STEP ㉕ | (x25,y25) | IMAGE | COLOR | R:100,G:95, B:55 | R:100,G:94, B:32 . . . | 4 | ▼NON-DEFECT |
| SCENARIO ② | | | | | | | | |
| | STEP ① | (x1,y1) | DATE | CONTENT | 2023/9/28 (THURSDAY) MORNING | 2023/9/28 (FRIDAY) MORNING | 1 | ▼EXCLUDE |
| | ... | ... | ... | ... | ... | ... | ... | ... |
| ... | | | | | | | | |
| | ... | ... | ... | ... | ... | ... | ... | ... |

[FIG. 23]
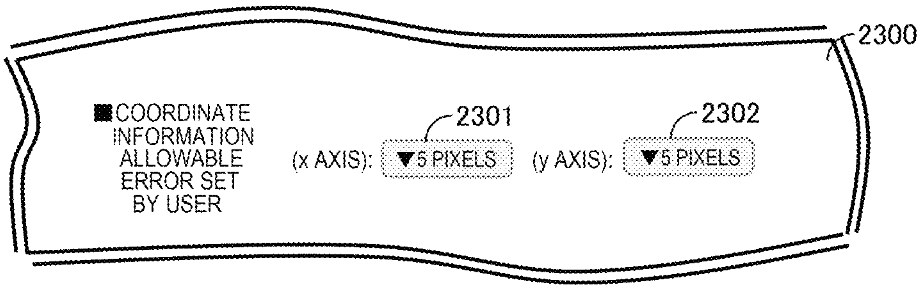

[FIG. 24]

114

| ID (114a) | SCREEN INFORMA-TION ID (114b) | COORDINATE INFORMATION (114c) | CONTENT TYPE (114d) | DIFFERENCE TYPE (114e) | DIFFERENCE CONTENT ID (114f) | ORIGINAL CONTENT (114g) | CONTENT DURING EXECUTION (114h) | NUMBER OF OCCUR-RENCE (114i) |
|---|---|---|---|---|---|---|---|---|
| 00002 | 00025 | (x2, y2) | IMAGE | SIZE | 000002 | 198 × 245 | 216 × 32 ... | 4 |
| 00003 | 00025 | (x2, y2) | IMAGE | COLOR | 000002 | R:100,G:95, B:55 | R:100,G:94, B:32 ... | 4 |
| 00004 | 00027 | (x4, y4) | IMAGE | COORDINATES | 000003 | (x4, y4) | (x4+10, y4) | 3 |

[FIG. 25]

115

| ID (115a) | SCREEN INFORMA-TION ID (115b) | COORDINATE INFORMATION (115c) | CONTENT TYPE (115d) | DIFFERENCE TYPE (115e) | ORIGINAL CONTENT (115f) | CONTENT DURING EXECUTION (115g) | NON-DEFECT DIFFERENCE INFORMATION ID (115h) | DEFECT (115i) |
|---|---|---|---|---|---|---|---|---|
| 00001 | 00025 | (x2, y2) | IMAGE | COORDINATES | (x2, y2) | (x2+2, y2+5) | — | 0 |
| 00002 | 00026 | (x2, y2) | DATE | COORDINATES | (x2, y2) | (x2+2, y2+6) | — | 1 |
| 00003 | 00027 | (x4, y4) | IMAGE | COORDINATES | (x4, y4) | (x4+10, y4) | 00004 | 0 |

[FIG. 26]
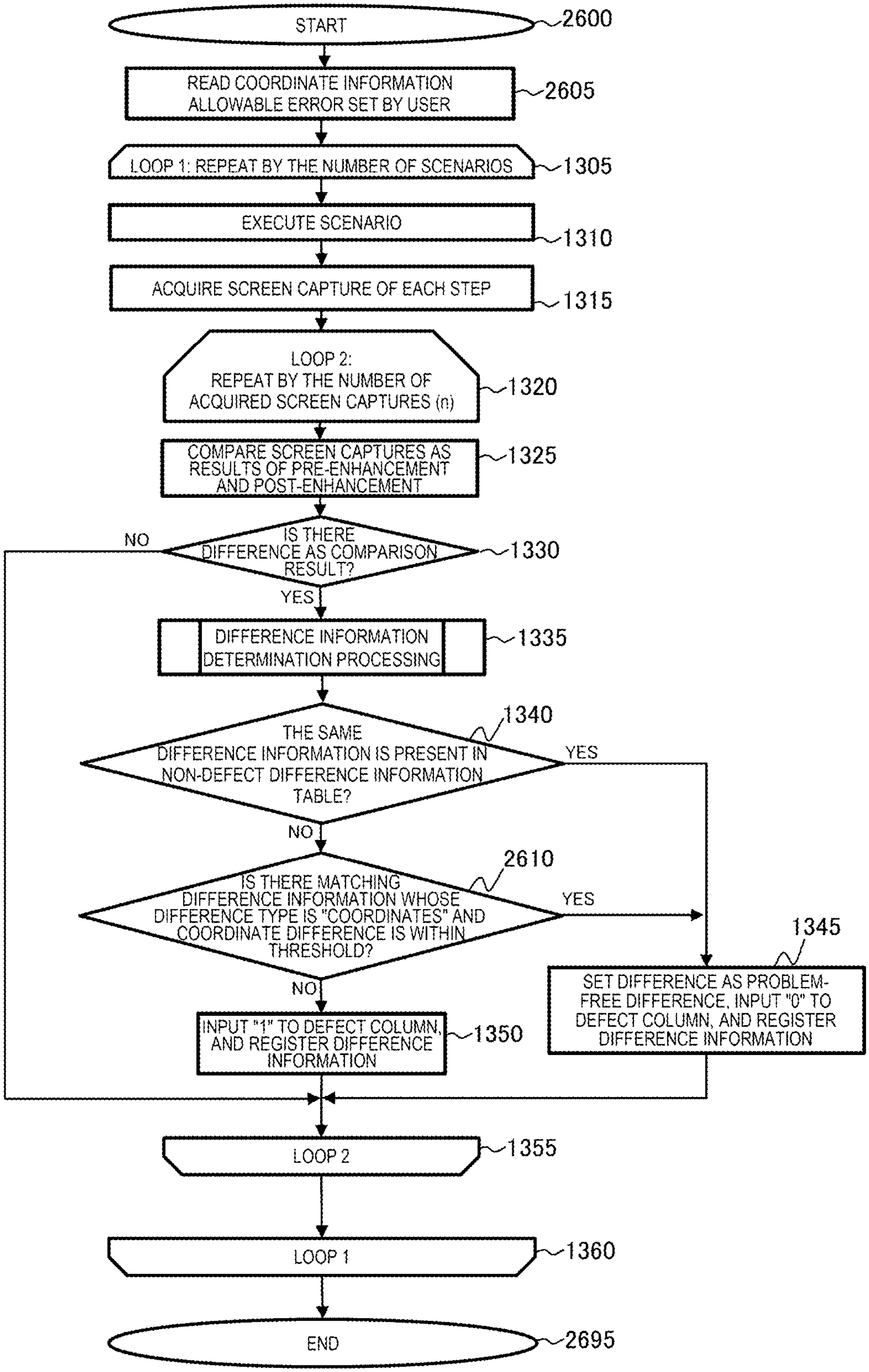

[FIG. 27A]
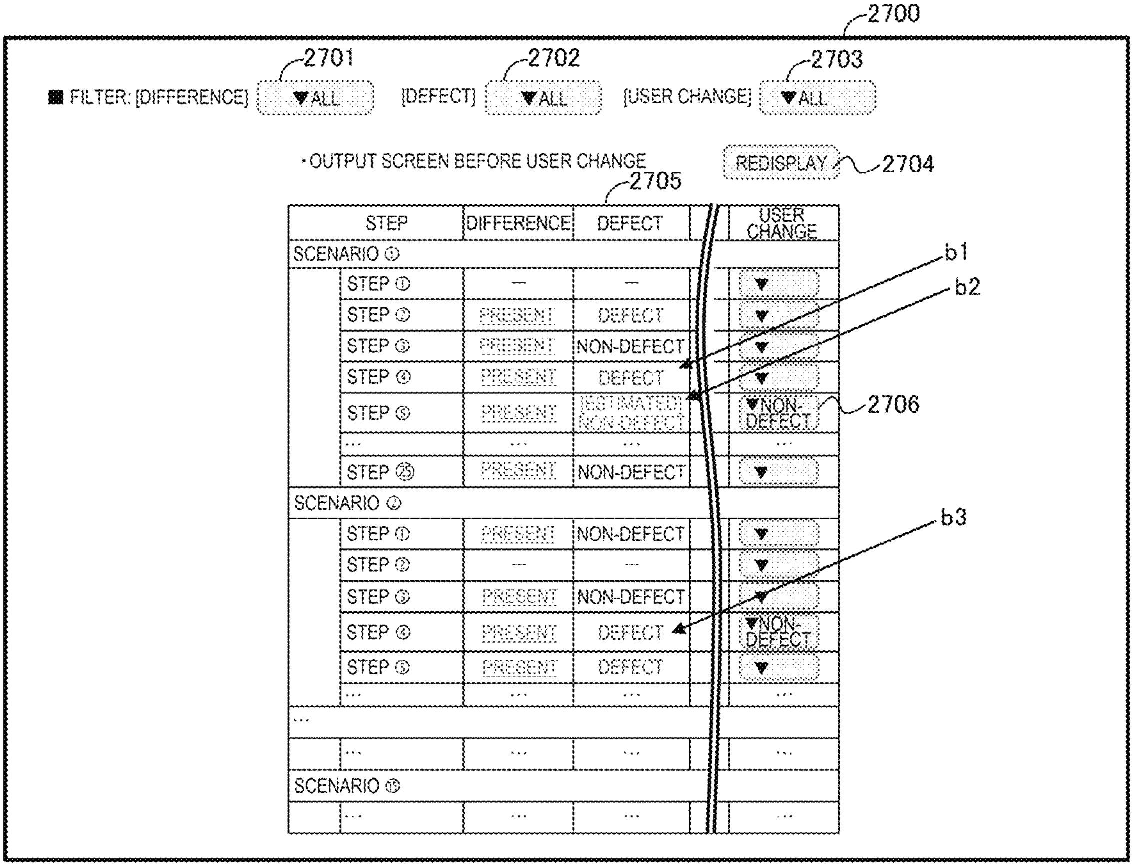

[FIG. 27B]
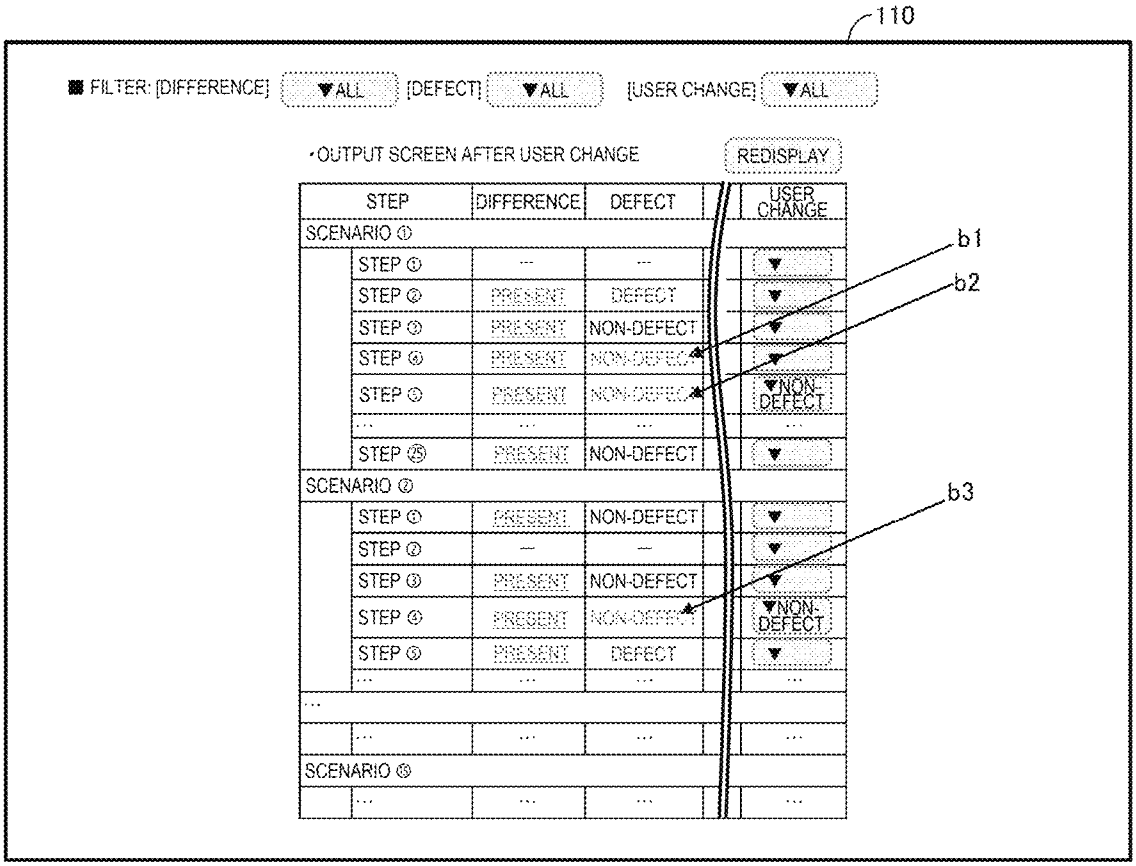

[FIG. 28]

115

| ID (115a) | SCREEN INFORMATION ID (115b) | COORDINATE INFORMATION (115c) | CONTENT TYPE (115d) | DIFFERENCE TYPE (115e) | ORIGINAL CONTENT (115f) | CONTENT DURING EXECUTION (115g) | NON-DEFECT DIFFERENCE INFORMATION ID (115h) | DEFECT (115i) | IMPORTANCE LEVEL (115j) |
|---|---|---|---|---|---|---|---|---|---|
| 00001 | 00025 | (x1, y1) | DATE | CONTENT | 2023/9/21 (THURSDAY) 15:35:00 | 2023/9/21 (THURSDAY) 17:00:00 | 000001 | 0 | MEDIUM |
| 00002 | 00025 | (x2, y2) | IMAGE | SIZE | 198 × 245 | 216 × 32 | 000002 | 0 | LOW |
| 00003 | 00025 | (x2, y2) | IMAGE | COLOR | R:100,G:95, B:55 | R:100,G:94, B:32 | 000003 | 0 | MEDIUM |
| 00004 | 00025 | (x3, y3) | DATE | CONTENT | 2023/9/27 (THURSDAY) MORNING | DATE CANNOT BE ACQUIRED. | — | 1 | MEDIUM |
| 00005 | 00025 | (x4, y4) | IMAGE | SIZE | 198 × 245 | null | — | 1 | LOW |
| 00006 | 00025 | (x4, y4) | IMAGE | COLOR | R:100,G:95, B:55 | R:0,G:0, B:0 | — | 1 | MEDIUM |

[FIG. 29]

2900

2901 2902 2903 2904

| ID | CONTENT TYPE | DIFFERENCE TYPE | IMPORTANCE LEVEL |
|---|---|---|---|
| 00001 | IMAGE | SIZE | LOW |
| 00002 | IMAGE | BACKGROUND COLOR | LOW |
| 00003 | IMAGE | COLOR | MEDIUM |
| 00004 | IMAGE | CONTENT | HIGH |
| 00005 | DATE | CONTENT | MEDIUM |
| 00006 | CHARACTER STRING | CONTENT | HIGH |

[FIG. 30]

3000

| | | DIFFERENCE TYPE | | | | | | |
|---|---|---|---|---|---|---|---|---|
| CONTENT TYPE | | SIZE | BACKGROUND COLOR | CHARACTER STRING | COLOR | FONT | CONTENT | COORDINATES |
| | IMAGE | LOW | | | LOW | | HIGH | |
| | DATE | | | | | | MEDIUM | |
| | CHARACTER STRING | | | | | | HIGH | |

[FIG. 31]
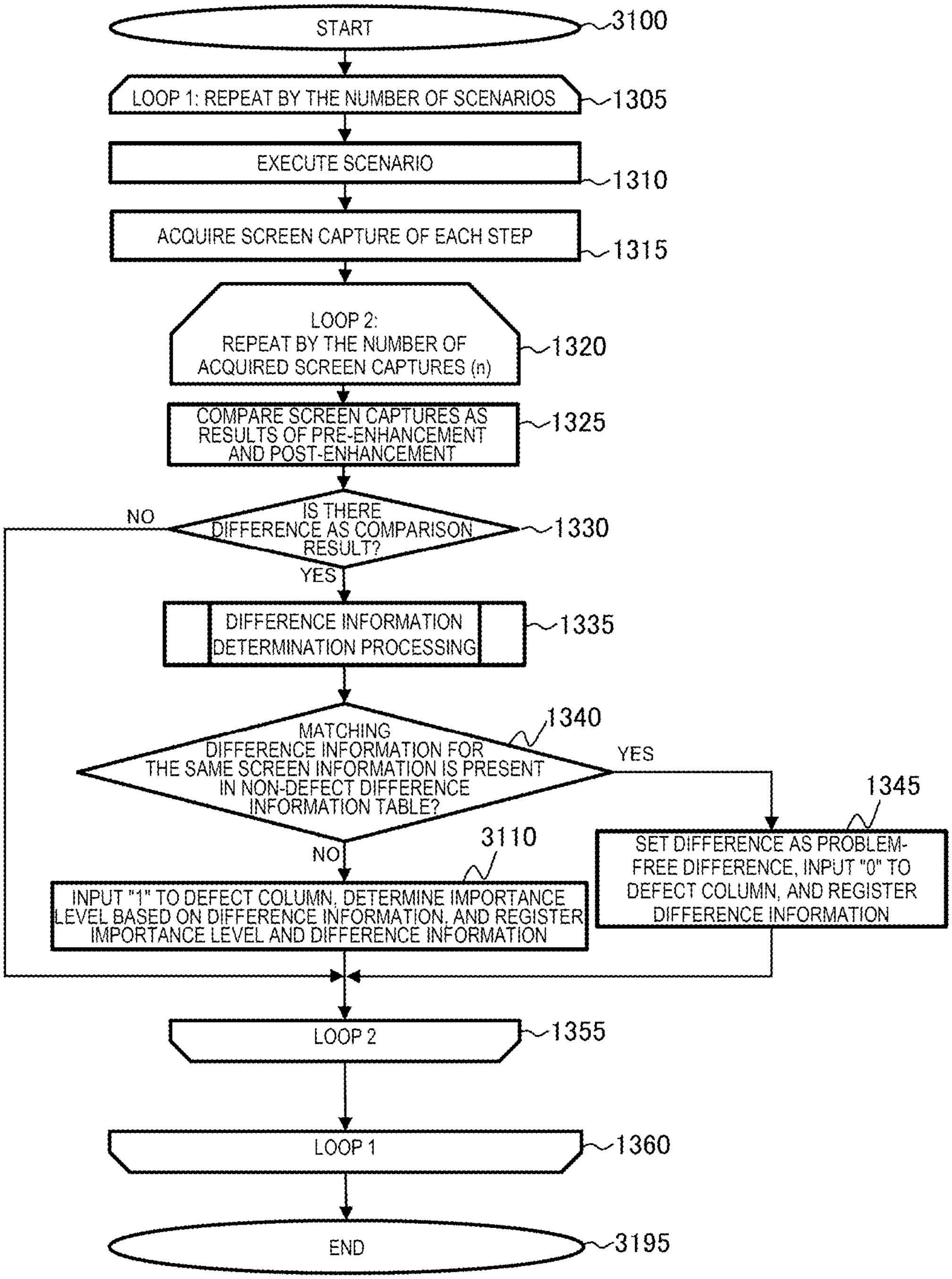

[FIG. 32]

3200

▼ALL
☑HIGH
☑MEDIUM
☐LOW

3201

■ FILTER: [IMPORTANCE LEVEL]

3202

| STEP | DIFFERENCE | DEFECT | CONTENT TYPE | DIFFERENCE TYPE | DIFFERENCE CONTENT | | IMPORTANCE LEVEL |
|---|---|---|---|---|---|---|---|
| | | | | | ORIGINAL CONTENT | CONTENT DURING EXECUTION | |
| SCENARIO ① | | | | | | | |
| STEP ④ | PRESENT | DEFECT | CHARACTER STRING | CONTENT | THANK YOU FOR YOUR PURCHASE! | null | HIGH |
| STEP ② | PRESENT | DEFECT | DATE | CONTENT | 2023/9/21 (THURSDAY) | 1900/1/0 | MEDIUM |
| STEP ③ | PRESENT | NON-DEFECT | DATE | CONTENT | 2023/9/28 (THURSDAY) | 2023/9/29 (FRIDAY) | MEDIUM |
| STEP ㉕ | PRESENT | NON-DEFECT | IMAGE | COLOR | R:100,G:95, B:55 | R.100,G:94. B:32 | MEDIUM |
| STEP ⑤ | PRESENT | NON-DEFECT | IMAGE | SIZE | 198 × 245 | 216 × 32 | LOW |
| STEP ① | — | — | — | — | — | — | — |
| ... | ... | ... | ... | ... | ... | ... | ... |
| SCENARIO ② | | | | | | | |
| STEP ④ | PRESENT | DEFECT | IMAGE | CONTENT | picture1.jpg | null | HIGH |
| STEP ⑤ | PRESENT | DEFECT | DATE | CONTENT | 2023/9/21 (THURSDAY) | DATE CANNOT BE ACQUIRED. | MEDIUM |
| STEP ⑦ | PRESENT | NON-DEFECT | DATE | CONTENT | 2023/9/28 (THURSDAY) | 2023/9/29 (FRIDAY) | MEDIUM |
| STEP ③ | PRESENT | NON-DEFECT | IMAGE | BACKGROUND COLOR | R:100,G:95, B:55 | R:100,G:94, B:32 | LOW |
| STEP ② | — | — | — | — | — | — | — |
| ... | ... | ... | ... | ... | ... | ... | ... |
| ... | | | | | | | |
| ... | ... | ... | ... | ... | ... | ... | |

[FIG. 33]

3300

| ID (3301) | NAME (3302) | CONTENT (3303) |
|---|---|---|
| 00001 | FIRST DETERMINATION CRITERION | WHEN DIFFERENCE IN COORDINATE VALUES IS WITHIN ALLOWABLE VALUE OF 5 PIXELS, DIFFERENCES ARE REGARDED AS THE SAME |
| 00002 | SECOND DETERMINATION CRITERION | . . . . |
| .... | . . . | . . . . |

[FIG. 34]
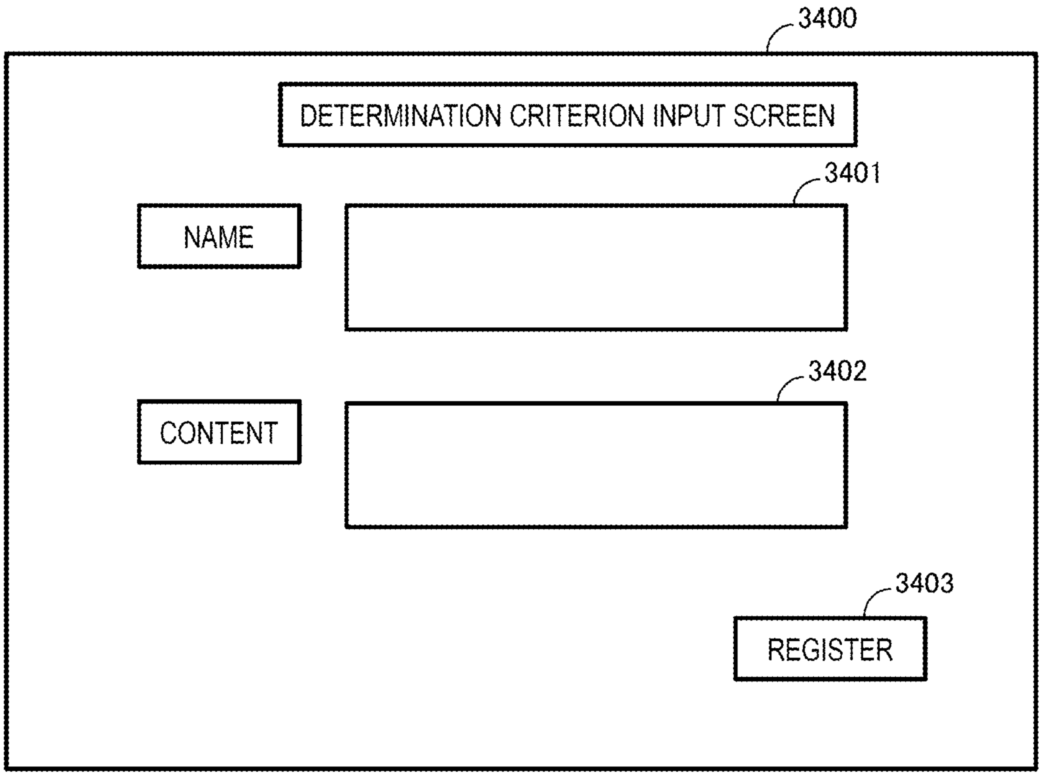

[FIG. 35]
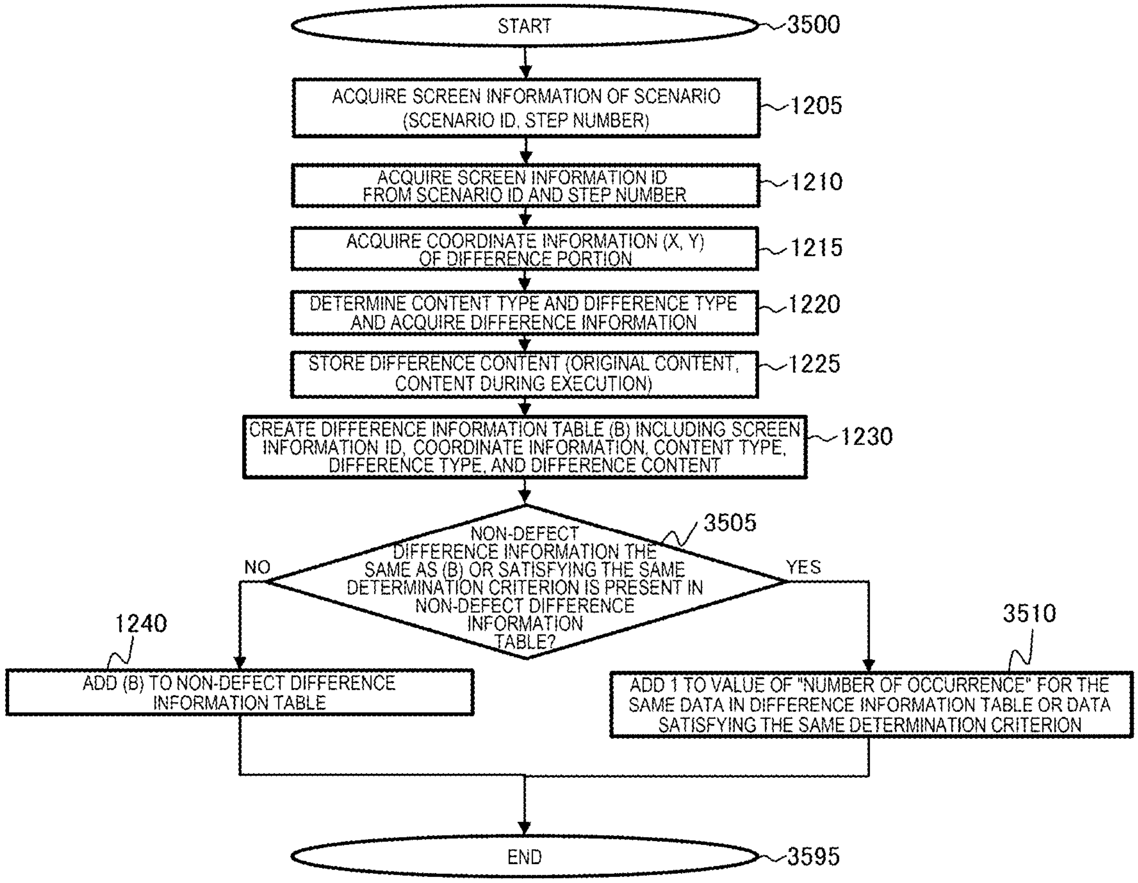

[FIG. 36]

3600

3601 3602 3603

| ID | NAME | CONTENT |
|---|---|---|
| 00001 | FIRST DETERMINATION CRITERION | · WHEN CONTENT TYPE OF TWO DIFFERENCES IS "DATE" AND DIFFERENCE TYPE OF TWO DIFFERENCES IS "FORMAT", FORMATS OF CONTENT DURING EXECUTION OF TWO DIFFERENCES ARE THE SAME |
| 00002 | SECOND DETERMINATION CRITERION | · WHEN CONTENT TYPE OF TWO DIFFERENCES IS IMAGE AND DIFFERENCE TYPE IS SIZE, PERCENTAGE (%) INDICATING DIFFERENCE IN SIZES BETWEEN IMAGES OF CONTENTS DURING EXECUTION OF TWO DIFFERENCES IS WITHIN PREDETERMINED THRESHOLD |
| 00003 | THIRD DETERMINATION CRITERION | · WHEN CONTENT TYPE OF TWO DIFFERENCES IS IMAGE AND DIFFERENCE TYPE IS COLOR, DIFFERENCE BETWEEN RGB VALUES OF CONTENTS DURING EXECUTION OF TWO DIFFERENCES IS WITHIN PREDETERMINED THRESHOLD |
| . . . | . . . | . . . . |

[FIG. 37]
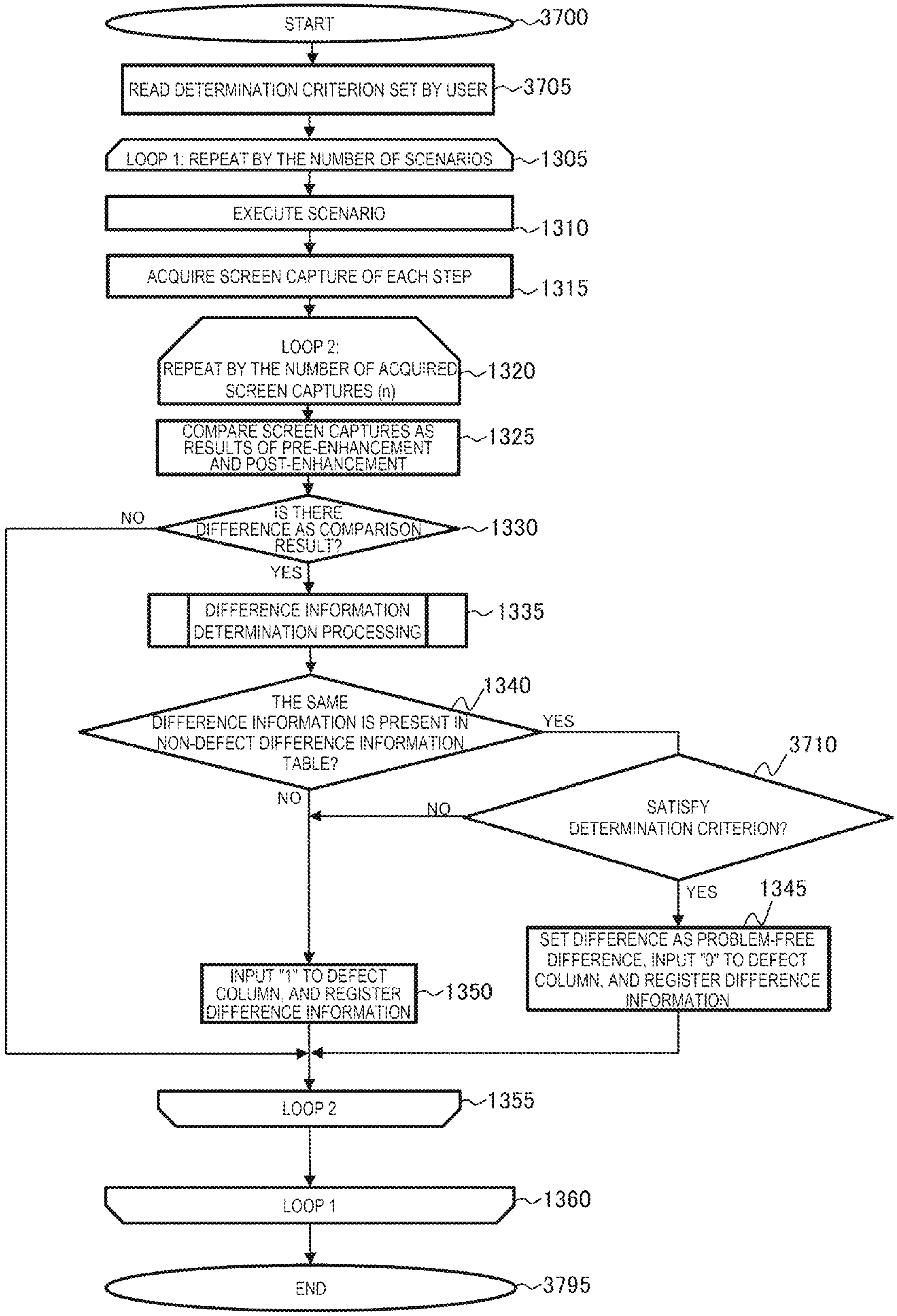

AUTOMATIC SCREEN OPERATION TEST SUPPORT APPARATUS AND AUTOMATIC SCREEN OPERATION TEST SUPPORT METHOD

CROSS REFERENCE TO RELATED APPLICATIONS

This application claims priority to Japanese Patent Application No. 2024-051691, filed Mar. 27, 2024, the contents of which are incorporated herein by reference in its entirety for all purposes.

TECHNICAL FIELD

The present invention relates to an automatic screen operation test support apparatus and an automatic screen operation test support method.

BACKGROUND ART

As one program automatic test method, there is a method (an automatic screen operation test) of extracting a difference by comparing images of program execution results and extracting a defect.

In an application example of the automatic screen operation test, a script for automatically executing a scenario indicating the same operation content under the same condition is executed in a pre-enhanced screen system and a post-enhanced screen system. Thereafter, all captures (bitmap data) saved at each point between operations of scenarios of the pre-enhanced screen system and the post-enhanced screen system are compared to check whether there is a difference, a point where the difference is generated is identified, and information indicating the specified difference is output, thereby providing the information indicating the difference to a user.

Differences that can be confirmed in the automatic screen operation test can be roughly classified into a problematic defect difference when a difference is generated and a problem-free non-defect difference even when a difference is generated. However, in an automatic screen operation test in the related art, a large number of captures (bitmap data) are captured at a large number of points between operations for each scenario, and information indicating a specified difference is output every time a difference is specified without distinguishing two types of differences, which leads to an enormous amount of work to check a large number of differences.

Related Art 1

Here, in an example of the related art (referred to as "related art 1"), before performing an automatic screen operation test, a portion where a problem-free change occurs is designated manually in advance by covering the portion with a blue frame, and then the automatic screen operation test is performed by excluding the designated portion from a difference comparison target. Accordingly, the number of difference comparison targets can be reduced in the related art 1.

Related Art 2

A technique in PTL 1 (JP2020-52861A) (referred to as "related art 2") acquires a result image of a first mode obtained by imaging a result screen output as an execution result of executing a first program under a first execution condition. In the related art 2, a result image of a second mode is acquired by imaging a result screen output as an execution result of executing a second program under a second execution condition. In the related art 2, the result image of the first mode and the result image of the second mode are compared to detect a difference. A control unit in the related art 2 specifies a candidate region from the detected difference based on a predetermined rule, the candidate region being a candidate of a region in which verification is not necessary in a verification test. In the related art 2, a result image of a third mode in which the candidate region can be specified is displayed on a display unit, and setting of a verification unnecessary region which is a region in which verification is unnecessary in the verification test is received. A user visually checks the result image of the third mode displayed on the display unit and sets the verification unnecessary region. Accordingly, the verification unnecessary region for performing a program verification test can be easily set in the related art 2.

Related Art 3

A technique of PTL 2 (JP2001-282578A) (referred to as "related art 3") records a test operation procedure for a program to be tested and an output result of the program to be tested for the operation procedure. In the related art 3, the recorded test operation procedure for the same program to be tested is reproduced, a difference between an output result of the reproduced test operation procedure and the recorded output result is obtained, and the difference is set as comparison exclusion data. In the related art 3, after the program to be tested is modified, the recorded test operation procedure is reproduced for the modified program to be tested, a difference between an output result of the reproduced test operation procedure and the recorded output result is obtained, and further the difference that is not present in the comparison exclusion data is output as a true difference. Accordingly, the technique in the related art 3 can automatically set a portion that is excluded from a comparison target, thereby eliminating a setting omission and resolving a problem, and the technique in the related art 3 can perform a program test such that it is easy to understand that a comparison difference display is not caused by specifications of the program to be tested and is caused by a defect.

CITATION LIST

Patent Literature

PTL 1: JP2020-52861A
PTL 2: JP2001-282578A

SUMMARY OF INVENTION

Technical Problem

In the related art 1, since it is necessary to manually designate a portion where a problem-free change occurs, there is a problem that an amount of manual work increases. In the related art 1, there is a problem that since a difference in the designated portion is not detected, when a problematic defect is generated in the designated portion, the problematic defect may not be noticed and may be overlooked.

In the related art 2, since the user manually sets the verification unnecessary region that is a region in which verification is unnecessary, there is a problem that an amount of manual work increases. Further, in the related art 2, since the verification unnecessary region is fixedly set and a difference in the verification unnecessary region is not detected, it is not possible to extract a problematic defect difference generated in the verification unnecessary region.

In the related art 3, a difference (a problem-free difference) generated by a single comparison between output results of the program to be tested before modification is set as the comparison exclusion data. However, there may be a problem-free difference (for example, a difference caused by a blink) that does not appear by a single comparison between output results, and the problem-free difference may not be set as the comparison exclusion data.

Accordingly, an object of the invention is to provide an automatic screen operation test support apparatus and an automatic screen operation test support method capable of extracting a problematic defect difference in an automatic screen operation test of a screen system without requiring manual work.

Solution to Problem

In order to solve the above problem, an automatic screen operation test support apparatus according to the invention includes an information processing device including a storage device configured to store non-defect difference list data and difference information list data. The information processing device is configured to execute non-defect list creation processing of comparing a first comparison reference screen and a first comparison target screen that are acquired by performing an automatic screen operation on an operation content indicated by a specific scenario for each of a comparison reference screen system and a comparison target screen system for registering the same non-defect difference, thereby executing, a plurality of times, a first automatic screen operation test of extracting a difference generated on the first comparison target screen as compared with the first comparison reference screen, determining the extracted difference, and recording the determined difference in the non-defect difference list data as a non-defect difference, and defect difference checking processing of comparing a second comparison reference screen and a second comparison target screen that are acquired by performing an automatic screen operation on an operation content indicated by a scenario the same as the specific scenario for each of a comparison reference screen system for registering the non-defect difference and a comparison target screen system of a defect extraction target, thereby executing a second automatic screen operation test of extracting a difference generated on the second comparison target screen as compared with the second comparison reference screen, determining the extracted difference, recording the determined difference in the difference information list data, and based on the difference information list data and the non-defect difference list data, specifying, as a non-defect difference, a difference in the difference information list data that is the same as the non-defect difference recorded in the non-defect difference list data, and specifying, as a defect difference, a difference in the difference information list data other than the specified non-defect difference.

An automatic screen operation test support method according to the invention is an automatic screen operation test support method using an information processing device including a storage device configured to store non-defect difference list data and difference information list data, the automatic screen operation test support method includes: executed by the information processing device, non-defect list creation processing of comparing a first comparison reference screen and a first comparison target screen that are acquired by performing an automatic screen operation on an operation content indicated by a specific scenario for each of a comparison reference screen system and a comparison target screen system for registering the same non-defect difference, thereby executing, a plurality of times, a first automatic screen operation test of extracting a difference generated on the first comparison target screen as compared with the first comparison reference screen, determining the extracted difference, and recording the determined difference in the non-defect difference list data as a non-defect difference; and defect difference checking processing of comparing a second comparison reference screen and a second comparison target screen that are acquired by performing an automatic screen operation on an operation content indicated by a scenario the same as the specific scenario for each of a comparison reference screen system for registering the non-defect difference and a comparison target screen system of a defect extraction target, thereby executing a second automatic screen operation test of extracting a difference generated on the second comparison target screen as compared with the second comparison reference screen, determining the extracted difference, recording the determined difference in the difference information list data, and based on the difference information list data and the non-defect difference list data, specifying, as a non-defect difference, a difference in the difference information list data that is the same as the non-defect difference recorded in the non-defect difference list data, and specifying, as a defect difference, a difference in the difference information list data other than the specified non-defect difference.

Advantageous Effects of Invention

According to the invention, in the automatic screen operation test of a screen system, it is possible to extract a problematic defect difference without requiring manual work. The effects described herein are not necessarily limited, and may be any effect described in the present disclosure.

BRIEF DESCRIPTION OF DRAWINGS

FIG. 1 is a schematic configuration diagram showing a configuration example of an automatic screen operation test support apparatus according to a first embodiment of the invention.

FIG. 2 is a diagram showing a screen information table.

FIG. 3 is a diagram showing a non-defect difference information table.

FIG. 4 is a diagram showing a difference information table.

FIG. 5 shows an example of a captured screen on which a difference is generated at a point of a scenario.

FIG. 6 shows an example of a captured screen on which a difference is generated at a point of a scenario.

FIG. 7A is a view showing a related art and a problem.

FIG. 7B is a view showing a related art and a problem.

FIG. 8A is a view showing an overview of non-defect list creation processing.

FIG. 8B is a view showing an overview of the non-defect list creation processing.

FIG. 8C is a view showing an overview of the non-defect list creation processing.

FIG. 8D is a view showing an overview of the non-defect list creation processing.

FIG. 9A is a view showing a specific example of the non-defect list creation processing.

FIG. 9B is a view showing a specific example of the non-defect list creation processing.

FIG. 9C is a view showing a specific example of the non-defect list creation processing.

FIG. 9D is a view showing a specific example of the non-defect list creation processing.

FIG. 10A is a view showing an overview of defect difference checking processing.

FIG. 10B is a view showing an overview of the defect difference checking processing.

FIG. 10C is a view showing an overview of the defect difference checking processing.

FIG. 11 is a flowchart showing a processing flow of the non-defect list creation processing executed by a non-defect list creation unit.

FIG. 12 is a flowchart showing a processing flow of difference information determination and DB registration processing executed by the non-defect list creation unit.

FIG. 13 is a flowchart showing a processing flow of the defect difference checking processing executed by a defect difference checking unit.

FIG. 14 is a flowchart showing a processing flow of difference information determination processing executed by the defect difference checking unit.

FIG. 15 is a view showing a user confirmation screen.

FIG. 16 is a view showing a defect difference display screen after the defect difference checking processing.

FIG. 17 is a view showing a comparison screen including a captured screen on which a difference is generated.

FIG. 18 is a view showing a defect difference display screen after a clear filter button is operated on a defect difference display screen shown in FIG. 17.

FIG. 19 is a diagram showing a non-defect difference information table.

FIG. 20 is a view showing a part of a threshold number setting screen.

FIG. 21 is a flowchart showing a processing flow of non-defect list creation processing executed by a non-defect list creation unit.

FIG. 22 is a view showing a user confirmation screen.

FIG. 23 is a view showing a part of an allowable coordinate setting screen.

FIG. 24 is a diagram showing an example of a non-defect difference information table.

FIG. 25 is a diagram showing an example of a difference information table.

FIG. 26 is a flowchart showing a processing flow of defect difference checking processing executed by a defect difference checking unit.

FIG. 27A is a view showing a defect difference display screen after defect difference checking.

FIG. 27B is a view showing a defect difference display screen.

FIG. 28 is a diagram showing a difference information table.

FIG. 29 is a diagram showing an importance level table.

FIG. 30 is a view showing an importance level setting screen.

FIG. 31 is a flowchart showing a processing flow of defect difference checking processing.

FIG. 32 is a view showing a defect difference display screen after defect difference checking.

FIG. 33 is a diagram showing a determination criterion table.

FIG. 34 is a view showing a determination criterion input screen.

FIG. 35 is a flowchart showing a processing flow of difference information determination and DB registration processing executed by a non-defect list creation unit 111*a*.

FIG. 36 is a diagram showing a non-defect difference determination definition table.

FIG. 37 is a flowchart showing a processing flow of defect difference checking processing executed by a defect difference checking unit.

DESCRIPTION OF EMBODIMENTS

Hereinafter, an embodiment of the invention will be described with reference to the drawings. In the drawings of the embodiments, the same or corresponding parts may be denoted by the same reference numerals.

In the following description, although various kinds of information may be described by expressions such as "database", "table", and "list", the various kinds of information may be expressed by other data structures. In the case of describing identification information, although expressions such as "ID", "identification number", and "name" are used, these expressions can be replaced with one another.

In the following description, although processing may be described using a functional block as a subject, the subject of the processing may be a CPU or a device instead of the functional block. The subject of the processing executed by executing a program may be a calculation unit and may include a dedicated circuit that executes specific processing. Here, the dedicated circuit is, for example, a field programmable gate array (FPGA), an application specific integrated circuit (ASIC), and a complex programmable logic device (CPLD).

In the following description, the program may be installed in a computer from a program source. The program source may be, for example, a program distribution server or a computer-readable storage medium. When the program source is a program distribution server, the program distribution server may include a processor and a storage resource for storing a program to be distributed, and the processor of the program distribution server may distribute the program to be distributed to another computer. In each embodiment, two or more programs may be implemented as one program, or one program may be implemented as two or more programs.

First Embodiment

An automatic screen operation test support apparatus 100 (see FIG. 1) according to a first embodiment of the invention will be described. In the present example, the automatic screen operation test support apparatus 100 is applied to a product order screen system (hereinafter, referred to as a "screen system") of an electronic commerce (EC). An application example of the automatic screen operation test support apparatus 100 is not limited to a product order screen system of EC, and can be applied to various other screen systems.

In the following description, an automatic screen operation, an automatic screen operation test (screen storage), and an automatic screen operation test (screen comparison) refer to the following operation and tests.

Automatic screen operation: a script for automatically executing a scenario indicating an operation content is executed in a screen system.

Automatic screen operation test (screen storage): an automatic screen operation is executed for a screen system, and a screen is captured at a point (also referred to as a "step") between operations executed in the scenario, thereby acquiring and storing a captured screen (bitmap data).

Automatic screen operation test (screen comparison): for each of a comparison reference screen system and a comparison target screen system, captured screens of the same step of the comparison reference screen system and the comparison target screen system are compared using captured screens stored by the automatic screen operation test (screen storage), and a difference generated on the captured screen of the comparison target screen system as compared with the captured screen of the comparison reference screen system is extracted.

Both the automatic screen operation test (screen storage) and the automatic screen operation test (screen comparison) are collectively referred to as an "automatic screen operation test".

FIG. 1 is a schematic configuration diagram showing a configuration example of the automatic screen operation test support apparatus 100 according to the first embodiment of the invention. As shown in FIG. 1, the automatic screen operation test support apparatus 100 includes a non-volatile storage device 110 capable of reading and writing data, a memory 120 (for example, RAM), a CPU 130, an input and output interface 140, a network interface 150, and a display 160. A device including the CPU 130, the storage device 110, the memory 120, the input and output interface 140, the network interface 150, and a bus 170 is also referred to as an "information processing device" for convenience. The information processing device may be a plurality of information processing devices or a virtual information processing device constructed on a cloud.

The storage device 110 holds (stores) a program 111 and a database 112.

The CPU 130 loads the program 111 stored in the storage device 110 into the memory 120. The CPU 130 implements various functions of the automatic screen operation test support apparatus 100 by executing the program 111 loaded into the memory 120.

The program 111 includes a non-defect list creation unit 111_a_ and a defect difference checking unit 111_b_. The non-defect list creation unit 111_a_ repeats the automatic screen operation test a plurality of times with a creation target screen system of a non-defect difference information table 114 as the comparison reference screen system and the comparison target screen system, and registers (stores and updates) information related to a difference generated as a result in the non-defect difference information table 114. This processing is referred to as "non-defect list creation processing". The non-defect difference information table 114 may be referred to as "non-defect difference list data". The automatic screen operation test executed by the non-defect list creation unit 111_a_ may be referred to as a "first automatic screen operation test".

The non-defect difference checking unit 111_b_ executes the automatic screen operation test once with a pre-enhanced screen system as a comparison reference screen system and a post-enhanced screen system as a comparison target screen system, and registers (stores and updates) information related to a difference in a difference information table 115 based on a result of the automatic screen operation test. This processing is referred to as "defect difference checking processing". The difference information table 115 may be referred to as "difference information list data". The "automatic screen operation test" executed by the defect difference checking unit 111_b_ may be referred to as a "second automatic screen operation test". Details of the processing executed by the non-defect list creation unit 111_a_ and the defect difference checking unit 111_b_ will be described later.

The database 112 includes a screen information table 113, the non-defect difference information table 114, and the difference information table 115. Details of these pieces of information will be described later.

The program 111 to be executed by the CPU 130 is loaded into the memory 120 as described above, and data used when the CPU 130 executes the program 111 is temporarily stored in the memory 120.

The input and output interface 140 is an interface for connecting an operation device such as a keyboard and a mouse with the display 160 capable of displaying an image. The network interface 150 is an interface for connecting the automatic screen operation test support apparatus 100 to a network NW1 such as the Internet. The display 160 may be not provided in the automatic screen operation test support apparatus 100 and may be provided outside the automatic screen operation test support apparatus 100. The display 160 may also be referred to as a "display device" for convenience. The display 160 may be a touch panel having a function of displaying an image and a function of an operation device.

FIG. 2 is a diagram showing the screen information table 113. As shown in FIG. 2, the screen information table 113 includes a screen ID 113_a_, a scenario ID 113_b_, and a step number 113_c_ as columns for storing information (values). In the screen information table 113, information corresponding to each column related to a captured screen acquired by the automatic screen operation test (screen storage) is s associated with one another and stored as information (records) in units of rows. Specifically, the screen ID 113_a_ stores a screen information ID (identification number) for identifying a captured screen. The scenario ID 113_b_ stores an identification number for identifying a scenario from which the captured screen is acquired. The step number 113_c_ stores an identification number for identifying a point (a step) at which the captured screen is acquired.

FIG. 3 is a diagram showing the non-defect difference information table 114. As shown in FIG. 3, the non-defect difference information table 114 includes an ID 114_a_, a screen information ID 114_b_, coordinate information 114_c_, a content type 114_d_, a difference type 114_e_, a difference content ID 114_f_, an original content 114_g_, a content during execution 114_h_, and a number of occurrence 114_i_ as columns for storing information (values).

In the non-defect difference information table 114, information corresponding to each column related to a difference generated by the automatic screen operation test (difference comparison) in the non-defect list creation processing is associated with one another and stored as information (records) in units of rows.

Specifically, the ID 114_a_ stores an identification number for identifying non-defect difference information indicated by a row (a record) of the table. The non-defect difference information is information related to difference generated by executing, a plurality of times, the automatic screen operation test executed by the non-defect list creation unit 111_a_. One row (one record) is "non-defect difference information" indicating one non-defect difference.

The screen information ID 114_b_ stores a screen information ID that is an identification number for identifying a captured screen on which a difference is generated. The coordinate information 114*c* stores coordinates indicating a position on the captured screen where the difference is generated. The content type 114*d* stores a content type of the difference. The content type is a type of a content of the difference such as a date, an image, and a character string. The difference type 114*e* stores a type of the difference. The difference type is a type of the difference such as a size, a background color, a character color, a language, a font, a content, coordinates, and a format.

The difference content ID 114*f* stores an identification number for identifying a content of the difference (an original content and a content during execution). The same identification number is assigned to a difference content at the same position. The original content 114*g* stores a content of an image region in which a difference is generated on a comparison reference captured screen as compared with a comparison target captured screen. The content during execution 114*h* stores a content of an image region in which a difference is generated on the comparison target captured screen as compared with the comparison reference captured screen. The number of occurrence 114*i* stores the number of occurrence of the same difference generated as a result of repeating the automatic screen operation test a plurality of times in the non-defect list creation processing.

The coordinates indicating a position where a difference is generated, the content type of the difference, and the difference type may be referred to as "difference attribute information" or "difference attribute" Information including difference identification information (identification number), the difference attribute information, and information indicating the content of the difference is referred to as "difference information". Of the difference information, difference information indicating a non-defect difference is referred to as "non-defect difference information".

FIG. 4 is a diagram showing the difference information table 115. As shown in FIG. 4, the difference information table 115 includes an ID 115*a*, a screen information ID 115*b*, coordinate information 115*c*, a content type 115*d*, a difference type 115*e*, an original content 115*f*, a content during execution 115*g*, a non-defect difference information ID 115*h*, and a defect 115*i* as columns for storing information (values).

In the difference information table 115, information corresponding to each column related to a difference generated by executing the automatic screen operation test in the defect difference checking processing is associated with one another and stored as information (records) in units of rows.

Specifically, the ID 115*a* stores an identification number for identifying difference information indicated by a row (a record) of the table. The difference information is information related to a difference generated by the automatic screen operation test executed once in the defect difference checking processing. One row (one record) is "difference information" indicating one difference. The screen information ID 115*b* stores an identification number for identifying a captured screen. The coordinate information 115*c* stores coordinate values indicating a position on the captured screen where the difference is generated. The content type 115*d* stores a content type of the difference. The difference type 115*e* stores a type of the difference. The original content 115*f* stores a content of an image region in which a difference is generated on a comparison reference captured screen as compared with a comparison target captured screen. The content during execution 115*g* stores a content of an image region in which a difference is generated on the comparison target captured screen as compared with the comparison reference captured screen. The non-defect difference information ID 115*h* stores an identification number (ID) of non-defect difference information on a non-defect difference the same as a difference generated by one automatic screen operation test. The defect 115*i* stores information ("0" or "1") indicating whether a difference is a defect. When a value of the defect 115*i* is "0", it indicates that a difference is a non-defect difference (that is, not a defect difference), and when a value of the defect 115*i* is "1", it indicates that a difference is a defect difference.

Overview

An overview of the invention will be described.

Related Art and Problems

First, in order to facilitate understanding of the invention, the related art and problems will be described in detail.

In an example, an automatic screen operation test is executed for the purpose of specifying a difference caused by enhancement when a screen system is enhanced (improved). The automatic screen operation test is executed for a pre-enhanced screen system and a post-enhanced screen system, and a difference generated on a captured screen of the post-enhanced screen system as compared with a captured screen of the pre-enhanced screen system is extracted.

Differences generated by the automatic screen operation test can be roughly classified into a problem-free non-defect difference even when a difference is generated and a problematic defect difference when a difference is generated. FIGS. 5 and 6 illustrate examples of captured screens on which a difference is generated at a point of a certain scenario. FIG. 5 shows a captured screen of a pre-enhanced screen system, and FIG. 6 shows a captured screen of a post-enhanced screen system. In FIG. 6, differences surrounded by broken lines R1 are non-defect differences, and a difference surrounded by a dash-dotted line R2 is a defect difference. In the present example, a non-defect difference 1 (a purchase date and time), a non-defect difference 2 (a delivery date), and a non-defect difference 3 (an illustration) surrounded by the broken lines R1 are generated as non-defect differences. A defect difference 1 (an amount of a product C) surrounded by the dash-dotted line R2 is generated as a defect difference.

The non-defect difference 1 (the purchase date and time) is a problem-free difference (a non-defect difference) because the purchase date and time is input to this field when a program operates normally, and thus it can be determined that the non-defect difference 1 is generated due to a difference in an execution date and time of a scenario. The non-defect difference 2 (the delivery date) is a problem-free difference (a non-defect difference) because the delivery date corresponding to the purchase date and time is input to this field when a program operates normally, and thus it can be determined that the non-defect difference 2 is generated due to a difference in an execution date and time of a scenario. The non-defect difference 3 (the illustration) is a problem-free difference (a non-defect difference) because an illustration to be displayed is randomly selected and displayed from a plurality of illustrations at the time of completing an order when a program operates normally.

On the other hand, the defect difference 1 (the amount of the product C) is a problematic difference (a defect difference) because a difference occurs in the amount of the product C even though the same scenario (the scenario including an operation for purchasing the same product with the same number) is executed, and thus it can be determined that the difference is not caused by a normal program operation but is caused by an abnormal program operation due to enhancement of the screen system.

In an automatic screen operation test support apparatus in the related art, a large number of captured screens are captured at a large number of points between operations for each scenario, and information indicating a specified difference is output every time a difference is specified without distinguishing two types of differences, which leads to an enormous amount of work to check a large number of differences.

As shown in FIG. 7A, the automatic screen operation test support apparatus in the related art manually covers portions (portions indicated by arrows al to a3) where a change occurs due to a normal program operation with a frame filled with a specific color (for example, blue) indicated by hatching to reduce the number of difference comparison targets. However, the automatic operation screen operation test support apparatus in the related art has the following two problems. That is, it takes time and effort to manually set a difference comparison exclusion region. Since a difference is not detected in the difference comparison exclusion region, when a problematic difference (a defect difference) is generated in the difference comparison exclusion region (a portion indicated by an arrow a4) as shown in FIG. 7B, the difference is not detected, and a defect difference may be overlooked.

In addition, in an automatic screen operation test support apparatus in the related art such as the "related art 3" described in the "Background Art", as described in the "Technical Problem", there may be a problem-free difference (for example, a difference caused by a blink) that does not appear by a single comparison between output results, and the problem-free difference may not be set as comparison exclusion data.

SUMMARY OF INVENTION

In order to solve the above problem, the automatic screen operation test support apparatus 100 according to the first embodiment of the invention causes the non-defect list creation unit 111*a* to execute the non-defect list creation processing. The non-defect list creation unit 111*a* executes the automatic screen operation test a plurality of times using the same screen system as the comparison reference screen system and the comparison target screen system under the same scenario, determines an attribute and a content of a difference generated as a result, and registers information related to the determined difference (difference information) as non-defect difference information in the non-defect difference information table 114.

After executing the non-defect list creation processing, the automatic screen operation test support apparatus 100 causes the defect difference checking unit 111*b* to execute the defect difference checking processing. The non-defect difference checking unit 111*b* sets a pre-enhanced screen system as the comparison reference screen system, sets a post-enhanced screen system as the comparison target screen system, determines an attribute and a content of a difference generated as a result of executing the automatic screen operation test once under the same scenario, and registers information related to the determined difference as difference information in the difference information table 115.

Based on the difference information table 115 and the non-defect difference information table 114, the defect difference checking unit 111*b* specifies a non-defect difference from one or more differences indicated by the difference information table 115, and extracts (specifies), as a defect difference, a difference remaining by removing the specified non-defect difference from the one or more differences indicated by the difference information table 115.

As described above, the automatic screen operation test support apparatus 100 can extract (specify) a problematic defect difference without requiring manual work. Since the automatic screen operation test support apparatus 100 looks at differences in all image regions in the non-defect list creation processing and does not fixedly set a verification unnecessary region as in the related art, when a problematic difference (a defect difference) is generated in the difference comparison exclusion region, the automatic screen operation test support apparatus 100 can reduce a possibility of overlooking the defect difference. Since the automatic screen operation test support apparatus 100 registers, as a non-defect difference, a difference generated by executing the automatic screen operation test a plurality of times in the non-defect t list creation processing, the automatic screen operation test support apparatus 100 can register, as a non-defect difference, a problem-free difference (for example, a difference caused by a blink) that does not appear by a single comparison between output results.

(Non-Defect List Creation Processing)

An overview of the non-defect list creation processing will be described. The non-defect list creation unit 111*a* first executes the automatic screen operation test (screen storage) on a comparison reference screen system (in the present example, a pre-enhanced screen system). Specifically, the non-defect list creation unit 111*a* executes an automatic screen operation by executing a script for executing a scenario for a target screen system (in the present example, a pre-enhanced screen system).

An example of the scenario includes, for example, the following operations 1 to 26. Operation 1: input a user ID (a user A) on a login screen (a login screen shown in FIG. 8A). Operation 2: input a password (). Operation 3: press a "login" button. Transition to a shopping screen (a shopping screen shown in FIG. 8B). Operation 4: input "product A" as a keyword. Operation 5: press a "search" button. Operation 6: scroll to display a lower screen. Operation 7: press an "add to cart" button for a target product. Operation 8 to operation 23: repeat operation 4 to operation 7 by the number of times corresponding to the number of products to be purchased (twice for a product B, once for product C, and once for product D). Operation 24: press a "go to cart" button. Transition to a purchase confirmation screen (a purchase confirmation screen shown in FIG. 8C). Operation 25: press a "purchase decision" button. Transition to a purchase details screen (a purchase details screen shown in FIG. 8D). Operation 26**: press a "Close x" button. In the present example, step 1 to step 25 which are names (step numbers) for identifying points (steps) are assigned to points (steps) between operations.

The non-defect list creation unit 111*a* holds (stores) a plurality of captured screens captured at each point (step) of a scenario in the storage device 110. For convenience of description, each of the plurality of captured screens may be referred to as a "comparison reference screen" or a "first comparison reference screen". FIG. 9A shows a comparison reference screen GM90 which is an example of one comparison reference screen. The comparison reference screen GM90 is a captured screen captured at a point (the step 25) between the operation 25 and the operation 26.

The non-defect list creation unit 111*a* executes the automatic screen operation test (screen storage) on a comparison target screen system (the same pre-enhanced screen system as described above). Specifically, the non-defect list creation unit 111*a* executes the same scenario and acquires a captured screen captured in each step of the scenario. For convenience of description, each of a plurality of captured screens may be referred to as a "comparison target screen" or a "first comparison target screen". FIG. 9B shows a comparison target screen GM91 which is an example of one comparison target screen. Similar to the comparison reference screen 90, the comparison target screen GM91 is a captured screen captured at a point (the step 25) between the operation 25 and the operation 26.

The non-defect list creation unit 111*a* executes the automatic screen operation test (screen comparison). When there is a difference, the non-defect list creation unit 111*a* determines an attribute and a content of the difference, assigns an identification number to information related to the determined difference (non-defect difference information), and registers the non-defect difference information in the non-defect difference information table 114 (adds a new row (record) or updates a value of an existing row (record)).

The non-defect list creation unit 111*a* repeatedly executes the automatic screen operation test (the automatic screen operation test (screen storage) and the automatic screen operation test (screen comparison)) a predetermined number of times (10 times in the present example). Accordingly, the non-defect list creation unit 111*a* creates the non-defect difference information table 114.

Hereinafter, a specific example in which the non-defect list creation unit 111*a* creates the non-defect difference information table 114 by the non-defect list creation processing will be described with reference to FIGS. 9A to 9D.

The non-defect list creation unit 111*a* executes a first automatic screen operation test (the automatic screen operation test (screen storage) and the automatic screen operation test (screen comparison)). The non-defect list creation unit 111*a* executes a scenario, and compares a comparison reference screen with a comparison target screen captured in the same step for each of a plurality of steps of the scenario. As a result, a difference surrounded by a broken line R11 is generated on the comparison target screen GM91 shown in FIG. 9B as compared with the comparison reference screen GM90 shown in FIG. 9A captured in step 25. In this case, the non-defect list creation unit 111*a* determines an attribute and a content of the difference, assigns an identification number to information related to the determined difference, and adds the information as non-defect difference information to the non-defect difference information table 114.

The non-defect list creation unit 111*a* executes a second automatic screen operation test (the automatic screen operation test (screen storage) and the automatic screen operation test (screen comparison)). The non-defect list creation unit 111*a* executes a scenario, and compares a comparison reference screen with a comparison target screen captured in the same step for each of a plurality of steps of the scenario. As a result, differences surrounded by broken lines R12 are generated on a comparison target screen GM92 shown in FIG. 9C as compared with the comparison reference screen GM90 shown in FIG. 9A captured in step 25. In this case, the non-defect list creation unit 111*a* determines attributes and contents of the differences, assigns an identification number to information related to the determined differences, and adds the information as non-defect difference information to the non-defect difference information table 114. In the case of the second and subsequent automatic screen operation tests, a method of adding non-defect difference information differs depending on whether a difference is a difference generated for the first time. It should be noted that a color of characters "Thank you for your purchase" on the comparison target screen GM92 shown in FIG. 9C is different from a color of characters of "Thank you for your purchase" on the comparison reference screen GM90 shown in FIG. 9A (since the specification of the application drawing is a monochrome image, the color difference is not shown in FIGS. 9A and 9C).

As a result of determining the attribute and the content of the difference, when a difference (non-defect difference information) the same as the difference is already present in the non-defect difference information table 114, the non-defect list creation unit 111*a* increases a value of the number of occurrence 114*i* of the same difference (non-defect difference information) by "1", and updates information of the content during execution 114*h* as necessary. In the present example, since a difference (a purchase date and time) shown in FIG. 9C is the same as a difference (a purchase date and time) shown in FIG. 9B, information corresponding to the differences is updated in the non-defect difference information table 114. Whether the two differences (difference information) to be compared are the same is determined in principle based on "difference attribute information". When all "difference attribute information" of the two differences match, it is determined that the differences are the same. When at least one "difference attribute information" of the two differences is different, it is determined that the differences are not the same.

As a result of determining the attribute and the content of the difference, when no difference (non-defect difference information) the same as the difference is present in the non-defect difference information table 114 (that is, when the difference is a difference generated for the first time), the non-defect list creation unit 111*a* assigns an identification number to information related to the determined difference and adds the information as non-defect difference information to the non-defect difference information table 114. In the present example, a difference (an illustration) occurring in FIG. 9C corresponds to a case where no difference the same as the difference is present (a case where the difference is a difference generated for the first time), an identification number is assigned to information related to the determined difference (an illustration), and the information is added to the non-defect difference information table 114 as non-defect difference information.

When the automatic screen operation test (the automatic screen operation test (screen storage) and the automatic screen operation test (screen comparison)) the same as the second automatic screen operation test is repeatedly executed a predetermined number of times (10 times in the present example), the non-defect list creation unit 111*a* ends the non-defect list creation processing.

FIG. 9D shows an example of a comparison target screen GM93 when a last (tenth) automatic screen operation test (the automatic screen operation test (screen storage) and the automatic screen operation test (screen comparison)) is executed. Similar to the second automatic screen operation test, the non-defect list creation unit 111*a* compares a comparison reference screen and a comparison target screen captured in the same step for each of a plurality of steps of a scenario. As a result, differences surrounded by broken lines R13 are generated on the comparison target screen GM93 shown in FIG. 9D as compared with the comparison reference screen GM90 shown in FIG. 9A captured in step 25. In this case, similar to the second automatic screen operation test, the non-defect list creation unit 111*a* determines an attribute and a content of the difference, assigns an identification number to information related to the determined difference, and adds the information to the non-defect difference information table 114.

In the present example, since a difference (a purchase date and time) shown in FIG. 9D is the same as a difference (a purchase date and time) shown in FIG. 9B (FIG. 9C), a value of the number of occurrence 114*i* of the non-defect difference information is increased by "1" in the non-defect difference information table 114. Further, in the present example, a difference (a delivery date) corresponds to a case where no difference the same as the difference is present (a case where the difference is a difference generated for the first time), and an identification number is assigned to information related to the determined difference (the delivery date), and the information is added to the non-defect difference information table 114 as non-defect difference information.

As a result of executing the above-described non-defect list creation processing, the non-defect difference information table 114 shown in FIG. 3 is created.

After executing the non-defect list creation processing, the non-defect list creation unit 111*a* outputs a user confirmation screen 1500 (see FIG. 15) including information related to a non-defect difference to the display 160 based on the non-defect difference information table 114, and displays the user confirmation screen 1500 on the display 160. A user can confirm a content of the non-defect difference obtained as a result of executing the non-defect list creation processing by looking at the user confirmation screen 1500 displayed on the display 160. Details of the user confirmation screen 1500 will be described later.

(Overview of Defect Difference Checking Processing)

An overview of the defect difference checking processing will be described. The defect difference checking unit 111*b* first executes the automatic screen operation test (screen storage) on a comparison reference screen system (in the present example, a pre-enhanced screen system). Specifically, the defect difference checking unit 111*b* executes an automatic screen operation by executing a script for executing a scenario for the pre-enhanced screen system for a defect difference checking target screen system. The pre-enhanced screen system is the same as the pre-enhanced screen system used in the non-defect list creation processing, and the scenario is the same as the scenario executed in the non-defect list creation processing.

The defect difference checking unit 111*b* holds (stores) a plurality of captured screens captured in each step of the scenario in the storage device 110. Each of the plurality of captured screens may be referred to as a "defect checking comparison reference screen" or a "second comparison reference screen". FIG. 10A shows a defect checking comparison reference screen GM100 which is an example of the defect checking comparison reference screen.

The defect difference checking unit 111*b* executes the automatic screen operation test (screen storage) on a defect checking target screen system (in the present example, a post-enhanced screen system). Specifically, the defect difference checking unit 111*b* executes a scenario and acquires a plurality of captured screens captured in each step of the scenario. Each of the plurality of captured screens may be referred to as a "defect checking comparison target screen" or a "second comparison target screen". FIG. 10B shows a defect checking comparison target screen GM101 which is an example of the defect checking comparison target screen.

The defect difference checking unit 111*b* executes the automatic screen operation test (screen comparison). When a difference is generated on the defect checking comparison target screen as compared with the defect checking comparison reference screen, the defect difference checking unit 111*b* determines an attribute and a content of the difference, assigns an identification number to information related to the determined difference, and registers the information as difference information in the difference information table 115 (adds a new row (record)).

For example, a difference 1 (a purchase date and time) and a difference 2 (an amount of the product C) surrounded by broken lines R21 are generated on the defect checking comparison target screen GM101 shown in FIG. 10B as compared with the defect checking comparison reference screen GM100 shown in FIG. 10A. In this case, the defect difference checking unit 111*b* determines an attribute and a content of each of the difference 1 (the purchase date and time) and the difference 2 (the amount of the product C), assigns an identification number to information (information other than the defect 115*i*) related to each of the determined difference 1 and difference 2, and adds the information as difference information to the difference information table 115.

The defect difference checking unit 111*b* determines whether the differences generated on the defect checking comparison target screen GM101 as compared with the defect checking comparison reference screen GM100 are non-defect differences.

The defect difference checking unit 111*b* determines, as a non-defect difference, a difference (difference information) the same as the non-defect difference (non-defect difference information) registered in the non-defect difference information table 114 among the differences (difference information) generated on the defect checking comparison target screen GM101. For example, on the defect checking comparison target screen GM101 shown in FIG. 10B, for the difference 1 (the purchase date and time), a non-defect difference the same as the difference 1 (the purchase date and time) is registered in the non-defect difference information table 114. Accordingly, as shown in FIG. 10C, the defect difference checking unit 111*b* determines that the difference 1 (the purchase date and time) surrounded by a frame 31 is a non-defect difference, and sets a value of the defect 115*i* corresponding to the difference (difference information) determined as the non-defect difference to "0" in the difference information table 115.

The defect difference checking unit 111*b* determines, as a defect difference, a difference that is not registered in the non-defect difference information table 114 among differences generated by defect checking. For example, on the defect checking comparison target screen showing in FIG. 10B, the difference 2 (the amount of the product C) is not registered in the non-defect difference information table 114. Accordingly, as shown in FIG. 10C, the defect difference checking unit 111*b* determines the difference 2 (the amount of the product C) surrounded by a frame 32 as a defect difference, and sets a value of the defect 115*i* corresponding to the difference (difference information) determined as the defect difference to "1" in the difference information table 115.

As described above, the defect difference checking unit 111*b* can determine whether a difference generated on the defect checking comparison target screen as compared with the defect checking comparison reference screen is a non-defect difference or a defect difference.

The defect difference checking unit 111*b* creates a defect difference display screen 1600 (see FIG. 16) based on the difference information table 115. The defect difference checking unit 111*b* outputs the defect difference display screen 1600 to the display 160 and displays the defect difference display screen 1600 on the display 160. A user can confirm a content of a difference generated by executing the defect difference checking processing by looking at the defect difference display screen 1600. Details of the defect difference display screen 1600 will be described later.

<Specific Operation>

FIG. 11 is a flowchart showing a processing flow of the non-defect list creation processing executed by the non-defect list creation unit 111*a* of the automatic screen operation test support apparatus 100.

The non-defect list creation unit 111*a* starts the processing from step 1100 shown in FIG. 11, and executes the processing from step 1105 to step 1175 as described below.

Step 1105: When the non-defect list creation unit 111*a* proceeds the processing flow to step 1105 which is a start point of processing in a loop 1, the non-defect list creation unit 111*a* starts execution of the processing in the loop 1 from step 1105 to step 1175. The processing in the loop 1 is repeatedly executed until an end condition of the loop 1 (repeated by the number of scenarios to be executed) is satisfied in step 1175 which is an end point of the processing in the loop 1.

Step 1110: The non-defect list creation unit 111*a* selects an unexecuted scenario from the scenarios to be executed, and executes the selected scenario for a target screen system. Hereinafter, for convenience of description, the scenario selected in step 1110 may be referred to as an "execution target scenario".

Step 1115: The non-defect list creation unit 111*a* acquires a screen capture (Xn) of each step. The screen capture is a captured screen.

Step 1120: The non-defect list creation unit 111*a* acquires screen information (A) assigned to each screen capture. The screen information (A) includes a screen information ID assigned to the screen capture, a scenario ID assigned to the execution target scenario, and a step number assigned to the step in which the screen capture is acquired.

Step 1125: The non-defect list creation unit 111*a* registers the screen information (A) of the scenario in the screen information table 113.

Step 1130: When the non-defect list creation unit 111*a* proceeds the processing flow to step 1130 which is a start point of processing in a loop 2, the non-defect list creation unit 111*a* starts execution of the processing in the loop 2 from step 1130 to step 1170. The processing in the loop 2 is repeatedly executed until an end condition of the processing in the loop 2 (repeated by N times) is satisfied in step 1170 which is an end point of the processing in the loop 2. In the present example, N=10 times.

Step 1135: The non-defect list creation unit 111*a* executes the execution target scenario for a target screen system.

Step 1140: The non-defect list creation unit 111*a* acquires a screen capture (Yn) of each step.

Step 1145: When the non-defect list creation unit 111*a* proceeds the processing flow to step 1145 which is a start point of processing in a loop 3, the non-defect list creation unit 111*a* starts execution of the processing in the loop 3 from step 1145 to step 1165. The processing in the loop 3 is repeatedly executed until an end condition of the processing in the loop 3 (repeated by the number of acquired screen captures (n)) is satisfied in step 1165 which is an end point of the processing in the loop 3.

Step 1150: The non-defect list creation unit 111*a* selects one screen capture (Y) from output N screen captures (Yn) (n=1 to N) in order from 1, and compares the selected screen capture (Y) with a screen capture (X).

Step 1155: The non-defect list creation unit 111*a* determines whether a difference is generated on the screen capture (Y) as compared with the screen capture (X). When a difference is generated on the screen capture (Y) as compared with the screen capture (X), the non-defect list creation unit 111*a* determines "YES" in step 1155 and proceeds the processing flow to step 1160. When no difference is generated on the screen capture (Y) as compared with the screen capture (X), the non-defect list creation unit 111*a* determines "NO" in step 1155 and directly proceeds the processing flow to step 1165.

Step 1160: The non-defect list creation unit 111*a* executes difference information determination and DB registration processing shown in FIG. 10 in order to determine an attribute and a content of the difference generated on the screen capture (Y). Details of this processing will be described later.

Step 1165: When the processing proceeds to step 1165 which is an end point of the processing in the loop 3, the non-defect list creation unit 111*a* determines whether an end condition of the processing in the loop 3 (repeated by the number of acquired screen captures (n)) is satisfied. When the end condition of the processing in the loop 3 (repeated by the number of acquired screen captures (n)) is not satisfied, the non-defect list creation unit 111*a* returns the processing to step 1145 which is the start point of the processing in the loop 3. When the end condition of the processing in the loop 3 (repeated by the number of acquired screen captures (n)) is satisfied, the non-defect list creation unit 111*a* ends the processing in the loop 3 and proceeds the processing flow to step 1170.

Step 1170: When the processing flow proceeds to step 1170 which is the end point of the processing in the loop 2, the non-defect list creation unit 111*a* determines whether the end condition of the processing in the loop 2 (repeated by N times) is satisfied. When the end condition of the processing in the loop 2 (repeated by N times) is not satisfied, the non-defect list creation unit 111*a* returns the processing flow to step 1130 which is the start point of the processing in the loop 2. When the end condition of the processing in the loop 2 (repeated by N times) is satisfied, the non-defect list creation unit 111*a* ends the processing in the loop 2 and proceeds the processing flow to step 1175.

Step 1175: When the processing flow proceeds to step 1175 which is the end point of the processing in the loop 1, the non-defect list creation unit 111*a* determines whether the end condition of the processing in the loop 1 (repeated by the number of scenarios to be executed) is satisfied. When the end condition of the processing in the loop 1 (repeated by the number of scenarios to be executed) is not satisfied, the non-defect list creation unit 111*a* returns the processing flow to step 1110 which is the start point of the processing in the loop 1. When the end condition of the processing in the loop 1 (repeated by the number of scenarios to be executed) is satisfied, the non-defect list creation unit 111*a* ends the processing in the loop 1, proceeds the processing flow to step 1195, and temporarily ends the present processing flow.

FIG. 12 is a flowchart showing a processing flow of the difference information determination and DB registration processing executed by the non-defect list creation unit 111*a* of the automatic screen operation test support apparatus 100.

When the non-defect list creation processing proceeds to step 1160 shown in FIG. 11, the non-defect list creation unit 111*a* starts from step 1200 shown in FIG. 12 and sequentially executes the processing from step 1205 to step 1230 as described below.

Step 1205: The non-defect list creation unit 111*a* acquires screen information (scenario ID and a step number) corresponding to the screen capture (Y).

Step 1210: The non-defect list creation unit 111*a* acquires a screen information ID corresponding to the scenario ID and the step number from the screen information table 113.

Step 1215: The non-defect list creation unit 111*a* acquires coordinate information (X, Y) of at least one difference portion generated on the screen capture (Y).

Step 1220: The non-defect list creation unit 111*a* determines a content type and a difference type of the difference portion and acquires difference information (difference attribute information).

Step 1225: The non-defect list creation unit 111*a* stores a content (an original content) of a difference portion on the screen capture (X) and a content (a content during execution) of the difference portion on the screen capture (Y).

Step 1230: The non-defect list creation unit 111*a* creates a difference information table (B) including the screen information ID, the coordinate information, the content type, and the difference content (the original content and the content during execution) that are acquired in step 1210 to step 1225. The difference information table (B) is information corresponding to one row (record) of the non-defect difference information table 114. When there are a plurality of difference portions, the difference information table (B) corresponding to each of the plurality of difference portions is created.

When the processing flow proceeds to step 1235, the non-defect list creation unit 111*a* determines whether information the same as the difference information table (B) is present in the non-defect difference information table 114. Here, the matter that the information the same as the difference information table (B) is present refers to that the screen information ID is the same, the coordinate information is the same, the content type is the same, and the difference type is the same.

When no information the same as the difference information table (B) is present in the non-defect difference information table 114, the non-defect list creation unit 111*a* determines "NO" in step 1235, proceeds the processing flow to step 1240, and adds (registers) the difference information table (B) to the non-defect difference information table 114. Thereafter, the non-defect list creation unit 111*a* proceeds the processing flow to step 1295 and temporarily ends the present processing flow.

When the information the same as the difference information table (B) is present in the non-defect difference information table 114, the non-defect list creation unit 111*a* determines "YES" in step 1235 and proceeds the processing flow to step 1245, and adds "1" to a value of the number of occurrence of non-defect difference information corresponding to the difference information table (B) that is already registered in the non-defect difference information table 114. Thereafter, the non-defect list creation unit 111*a* proceeds the processing flow to step 1295 and temporarily ends the present processing flow.

FIG. 13 is a flowchart showing a processing flow of the defect difference checking processing executed by the defect difference checking unit 111*b* of the automatic screen operation test support apparatus 100. The defect difference checking unit 111*b* starts the processing from step 1300 shown in FIG. 13, and executes the processing from step 1300 to step 1360 as described below.

Step 1305: When the defect difference checking unit 111*b* proceeds the processing flow to step 1305 which is a start point of processing in a loop 1, the defect difference checking unit 111*b* starts execution of the processing in the loop 1 from step 1305 to step 1360. The processing in the loop 1 is repeatedly executed until an end condition of the loop 1 (repeated by the number of scenarios to be executed) is satisfied in step 1360 which is an end point of the processing in the loop 1.

Step 1310: The defect difference checking unit 111*b* selects an unexecuted scenario from the scenarios to be executed, and executes the selected scenario for a pre-enhanced screen system corresponding to a defect checking target screen system. The defect difference checking unit 111*b* executes the selected scenario for the defect checking target screen system.

Step 1315: The non-defect difference checking unit 111*b* acquires a screen capture (a defect checking comparison reference screen) of each step for the pre-enhanced screen system. The defect difference checking unit 111*b* acquires a screen capture (a defect checking comparison target screen) of each step for the defect checking target screen system.

Step 1320: When the defect difference checking unit 111*b* proceeds the processing flow to step 1320 which is a start point of processing in a loop 2, the defect difference checking unit 111*b* starts execution of the processing in the loop 2 from step 1320 to step 1355. The processing in the loop 2 is repeatedly executed until an end condition of the processing in the loop 2 (repeated by the number of acquired screen captures (n)) is satisfied in step 1355 which is an end point of the processing in the loop 2.

Step 1325: The defect difference checking unit 111*b* selects a set of screen captures (a set of the defect checking comparison reference screen and the defect checking comparison target screen) for which the processing in the loop 2 is not executed, and compares the defect checking comparison reference screen with the defect checking comparison target screen.

Step 1330: The defect difference checking unit 111*b* determines whether at least one difference is generated on the defect checking comparison target screen as compared with the defect checking comparison reference screen as a result of the comparison. When at least one difference is generated on the defect checking comparison target screen as compared with the defect checking comparison reference screen, the defect difference checking unit 111*b* determines "YES" in step 1330 and proceeds the processing flow to step 1335. When no difference is generated on the defect checking comparison target screen as compared with the defect checking comparison reference screen, the defect difference checking unit 111*b* determines "NO" in step 1330 and proceeds the processing flow to step 1355.

Step 1335: The defect difference checking unit 111*b* executes difference information determination processing shown in FIG. 14. Details of this processing will be described later.

Step 1340: The defect difference checking unit 111*b* determines whether non-defect difference information the same as the difference information determined in step 1335 is present in the non-defect difference information table 114. The difference information and the non-defect difference information being the same refers to that the screen information ID is the same, the coordinate information is the same, the content type is the same, and the difference type is the same.

When the non-defect difference information the same as the difference information determined in step 1335 is present in the non-defect difference information table 114, the defect difference checking unit 111*b* determines "YES" in step 1340 and proceeds the processing flow to step 1345.

When no non-defect difference information the same as the difference information determined in step 1335 is present in the non-defect difference information table 114, the defect difference checking unit 111*b* determines "NO" in step 1340 and proceeds the processing flow to step 1350.

Step 1345: The defect difference checking unit 111*b* sets the determined difference information as a problem-free difference (a non-defect difference), stores a value of "0" in a column of defect in the difference information table 115, and stores (registers) the difference information in a corresponding row.

Step 1350: The defect difference checking unit 111*b* sets the determined difference information as a problematic difference (a defect difference), stores a value of "1" in a column of defect in the difference information table 115, and stores (registers) the difference information in a corresponding row.

Step 1355: When the defect difference checking unit 111*b* proceeds the processing flow to step 1355 which is the end point of the processing in the loop 2, the defect difference checking unit 111*b* determines whether the end condition of the processing in the loop 2 (repeated by the number of acquired screen captures (n)) is satisfied. When the end condition of the processing in the loop 2 (repeated by the number of acquired screen captures (n)) is not satisfied, the defect difference checking unit 111*b* returns the processing flow to step 1320 which is the start point of the processing in the loop 2. When the end condition of the processing in the loop 2 (repeated by the number of acquired screen captures (n)) is satisfied, the defect difference checking unit 111*b* ends the processing in the loop 2 and proceeds the processing flow to step 1360.

Step 1360: When the defect difference checking unit 111*b* proceeds the processing flow to step 1360 which is the end point of the processing in the loop 1, the defect difference checking unit 111*b* determines whether the end condition of the processing in the loop 1 (repeated by the number of scenarios to be executed) is satisfied. When the end condition of the processing in the loop 1 (repeated by the number of scenarios to be executed) is not satisfied, the defect difference checking unit 111*b* returns the processing flow to step 1305 which is the start point of the processing in the loop 1. When the end condition of the processing in the loop 1 (repeated by the number of scenarios to be executed) is satisfied, the defect difference checking unit 111*b* ends the processing in the loop 1, proceeds the processing flow to step 1395, and temporarily ends the present processing flow.

FIG. 14 is a flowchart showing a processing flow of the difference information determination processing executed by the defect difference checking unit 111*b* of the automatic screen operation test support apparatus 100. When the defect difference checking unit 111*b* proceeds the defect difference checking processing to step 1335 shown in FIG. 13, the defect difference checking unit 111*b* starts processing from step 1400 shown in FIG. 14, sequentially executes the processing from step 1405 to step 1425 as described below, and then temporarily ends the processing flow.

Step 1405: The defect difference checking unit 111*b* acquires screen information (a scenario ID and a step number) corresponding to the defect checking comparison target screen.

Step 1410: The defect difference checking unit 111*b* acquires a screen information ID corresponding to the scenario ID and the step number from the screen information table 113.

Step 1415: The defect difference checking unit 111*b* acquires coordinate information of at least one difference portion.

Step 1420: The defect difference checking unit 111*b* determines a content of the difference.

Step 1425: The defect difference checking unit 111*b* determines a content type and a difference type of the difference portion by referring to an existing technique (OCR).

<Output Screen>

The non-defect list creation unit 111*a* of the automatic screen operation test support apparatus 100 displays the user confirmation screen 1500 on the display 160 after the non-defect list creation processing. FIG. 15 shows the user confirmation screen 1500. As shown in FIG. 15, the user confirmation screen 1500 includes a number of occurrence filter button 1501, an upper and lower limit filter button 1502, and a non-defect difference list table 1503.

The number of occurrence filter button 1501 is a button operated by a user to select any one of "a plurality of numbers" indicating the number of occurrence displayed as an option.

The upper and lower limit filter button 1502 is a button operated by a user to select one of "or more" and "or less" displayed as options.

When any number is selected from "the plurality of numbers" by operating the number of occurrence filter button 1501 and "or more" is selected by operating the upper and lower limit filter button 1502, "the selected number of occurrence (number) or more" is set as a filter condition of the number of occurrence. When any number is selected from "the plurality of numbers" by operating the number of occurrence filter button 1501 and "or less" is selected by operating the upper and lower limit filter button 1502, "the selected number of occurrences (number) or less" is set as a filter condition of the number of occurrence.

When the number of occurrence filter button 1501 and the upper and lower limit filter buttons 1502 are operated, the non-defect list creation unit 111*a* creates the non-defect difference list table 1503 having contents corresponding to the selected condition based on the screen information table 113 and the non-defect difference information table 114, and outputs and displays the non-defect difference list table 1503 on the display 160.

The non-defect difference list table 1503 includes a plurality of non-defect difference lists collected in units of scenarios, and includes, as display of items of information on the non-defect difference lists, a difference occurrence step, coordinates, a content type, a difference type, a difference content (an original content and a content during execution), and the number of occurrence. The non-defect difference list corresponds to one row of the non-defect difference list table 1503. One non-defect difference list displays a content corresponding to one piece of non-defect difference information in the non-defect difference information table 114.

By looking at the non-defect difference list table 1503 on the user confirmation screen 1500, a user can grasp a determination result (an attribute and a content) and the number of occurrence of a difference generated in the non-defect list creation processing. Although illustration is omitted, when a user performs an operation of selecting a step number (for example, step 3 of scenario 1) in the non-defect difference list table 1503 (for example, an operation of double-clicking a mouse (an operation device) with a cursor Cs1 superimposed on step 3), the step (the step 3) is selected, and a comparison screen (not shown) including captured screens (the comparison reference screen and the comparison target screen) corresponding to the selected step (step 3) is displayed.

FIG. 16 shows the defect difference display screen 1600 after the defect difference checking processing. After the defect difference checking processing, the defect difference checking unit 111*b* displays the defect difference display screen 1600 on the display 160.

The defect difference display screen 1600 includes a difference filter button 1601, a defect filter button 1602, a content type filter button 1603, a difference type filter button 1604, a clear filter button 1605, and a difference list table 1606.

The difference list table 1606 includes a plurality of difference lists collected in units of scenarios, and includes, as display of items of information on the difference list table, a step, a difference, a defect, a content type, a difference type, and a difference content (an original content and a content during execution). The difference list corresponds to one row of the difference list table 1606. One difference list displays a content corresponding to one piece of difference information in the difference information table 115.

The difference filter button 1601 is a button operated by a user to select any one of "all", "yes", and "-" displayed as options.

When the user selects "all" by operating the difference filter button 1601, "all of a difference list in which information on an item of difference is 'yes' and a difference list in which information on the item of difference is '-'" are set as a filter condition.

When the user selects "yes" by operating the difference filter button 1601, "a difference list in which information on the item of difference is 'yes'" is set as a filter condition.

When the user selects "-" by operating the difference filter button 1601, "a difference list in which information on the item of difference is '-'" is set as a filter condition.

The defect filter button 1602 is a button operated by a user to select any one of "all", "defect", and "non-defect" displayed as options.

When the user selects "all" by operating the defect filter button 1602, "all of a difference list in which information on an item of defect is 'defect' and a difference list in which information on the item of defect is 'non-defect'" are set as a filter condition.

When the user selects "defect" by operating the defect filter button 1602, "a difference list in which information on the item of defect is 'defect'" is set as a filter condition.

When the user selects "non-defect" by operating the defect filter button 1602, "a difference list in which information on the item of defect is 'non-defect'" is set as a filter condition.

The content type filter button 1603 is a button operated by a user to select any one of "all", "image", "date", and "character string" displayed as options.

When the user selects "all" by operating the content type filter button 1603, "all difference lists in which information on an item of content type is any one option" is set as a filter condition.

When the user selects any one of "image", "date", "character string", and the like by operating the content type filter button 1603, "a difference list in which information on the item of content type is the selected option" is set as a filter condition.

The difference type filter button 1604 is a button operated by a user to select "all", "size", "background color", "character color", "color", "language", "font", "content", "coordinates", and the like displayed as options.

When the user selects "all" by operating the difference type filter button 1604, "all difference lists in which information on an item of difference type is any one option" is set as a filter condition.

When the user selects any one of "size", "background color", "character color", "color", "language", "font", "content", "coordinates", and the like by operating the difference type filter button 1604, "a difference list in which information on the item of difference type is the selected option" is set as a filter condition.

The defect difference checking unit 111*b* sets a final filter condition with set filter conditions as an "AND" condition, includes a difference list corresponding to the final filter condition in the difference list table 1606, and displays the difference list table 1606.

In the example shown in FIG. 16, the difference list table 1606 is displayed in a manner including, in the difference list table 1606, difference lists satisfying "all of a difference list in which information on the item of difference is 'yes' and a difference list in which information n the item of difference is 'no'", "a difference list in which information on the item of defect is 'defect'", "all difference lists in which information on the item of content type is any one option", and "all difference lists in which information on the item of difference type is any one of option".

In the example shown in FIG. 16, only differences are displayed so that a problematic defect difference can be easily identified. By looking at the difference list table 1606 on the defect difference display screen 1600, a user can easily grasp a determination result (an attribute and a content) of a defect difference generated in the defect difference checking processing.

The clear filter button 1605 is a button operated by a user to reset (remove or clear) a set filter condition.

FIG. 17 shows a comparison screen 1700 including a captured screen on which a difference is generated. When a user performs an operation of selecting "yes" in a difference list on the defect difference display screen 1600 shown in FIG. 16, the comparison screen 1700 shown in FIG. 17 is displayed. The comparison screen 1700 includes a difference content 1701 including detailed contents (an attribute and a content) of a difference corresponding to the difference list in which "yes" is selected, screens (a comparison reference screen 1702 and a comparison target screen 1703) on which the difference is generated, and a frame button 1704. The frame button 1704 is a button operated by a user to select any one of "no frame" and "add frame" displayed as options. When the user selects "no frame" by operating the frame button 1704, a frame 1705 is not superimposed on a difference portion on a checked captured screen (the comparison target screen 1703). When "add frame" is selected, the frame 1705 is superimposed on a difference portion on the checked captured screen (the comparison target screen 1703). By looking at the comparison screen 1700, the user can grasp details (an attribute and a content) of a difference content, and can visually grasp a portion where a difference is generated.

FIG. 18 shows the defect difference display screen 1600 after operating the clear filter button 1605 on the defect difference display screen 1600 shown in FIG. 16. When the clear filter button 1605 on the defect difference display screen 1600 shown in FIG. 16 is operated, a filter condition is reset. Accordingly, as shown in FIG. 18, "all" of the difference filter button 1601 is selected, "all" of the defect filter button 1602 is selected, "all" of the content type filter button 1603 is selected, and "all" of the difference type filter button 1604 is selected. The difference list table 1606 displays difference lists corresponding to the set filter condition. The defect difference display screen 1600 shown in FIG. 18 displays a difference generated as a result of the defect difference checking processing and a step number corresponding to a captured screen on which no difference is generated. That is, not only a difference list corresponding to the difference generated as a result of the defect difference checking processing, but also information (referred to as a "difference list (no difference)") on the step number corresponding to the captured screen on which no difference is generated in the defect difference checking processing is displayed. The difference list (no difference) includes, as information on an item of step, the step number corresponding to a captured screen on which no difference is generated, and includes "-" indicating that there is no information as information on other items. On the defect difference display screen 1600 shown in FIG. 18, a row of step 1 of a scenario 1 and a row of step 2 of a scenario 2 correspond to the difference list (no difference).

Effects

As described above, the automatic screen operation test support apparatus 100 according to the first embodiment of the invention can extract a problematic defect difference without requiring manual work. Since the automatic screen operation test support apparatus 100 according to the first embodiment looks at differences in all image regions in the non-defect list creation processing and does not fixedly set a verification unnecessary region as in the related art, when a problematic difference (a defect difference) is generated in a difference comparison exclusion region, the automatic screen operation test support apparatus 100 can reduce a possibility of overlooking the defect difference. Since the automatic screen operation test support apparatus 100 according to the first embodiment registers, as a non-defect difference, a difference generated by performing the automatic screen operation test a plurality of times in the non-defect list creation processing, the automatic screen operation test support apparatus 100 can register, as a non-defect difference, a problem-free difference (for example, a difference caused by a blink) that does not appear by a single comparison between output results.

Second Embodiment

The automatic screen operation test support apparatus 100 according to a second embodiment of the invention will be described. The automatic screen operation test support apparatus 100 according to the second embodiment differs from the automatic screen operation test support apparatus 100 according to the first embodiment in the following points.

The automatic screen operation test support apparatus 100 according to the second embodiment presents to a user a non-defect difference whose number of occurrence of differences is equal to or less than a threshold number in the non-defect list creation processing, and determines whether to exclude the non-defect difference from a non-defect difference (non-defect difference information) to be used in the defect difference checking processing based on determination of the user.

Hereinafter, the different point will be mainly described.

Overview

In the non-defect list creation processing, there is a high possibility that a difference having a large number of occurrence is a non-defect difference, and it tends to be difficult to determine whether a difference having a small number of occurrence is a non-defect difference.

Here, when the number of occurrence of a difference is equal to or less than a threshold number in the non-defect list creation processing, the automatic screen operation test support apparatus 100 according to the second embodiment presents a non-defect difference as an exclusion target to a user. The automatic screen operation test support apparatus 100 determines whether to exclude the non-defect difference from the non-defect difference (the non-defect difference information) to be used in the defect difference checking processing based on determination of the user.

FIG. 19 is a diagram showing the non-defect difference information table 114. The non-defect difference information table 114 is similar to the non-defect difference information table 114 shown in FIG. 3 except that a threshold flag **114*j* is added as a column for storing information. The threshold flag 114*j* stores information ("0" or "1") indicating whether the number of occurrence is equal to or less than a threshold number. "O" indicates that the number of occurrence is larger than the threshold number, and "1" indicates that the number of occurrence is equal to or less than the threshold number. The non-defect difference information for which the threshold flag 114*j* is "1" is excluded from the non-defect difference information to be used in the defect difference checking processing (step 1235 in FIG. 12**).

FIG. 20 is a diagram showing a part of a threshold number setting screen 2000. The threshold number setting screen 2000 includes a threshold number setting button 2001. The threshold number setting button b 2001 is a button operated by a user to select any one of a plurality of number of occurrence (numbers) displayed as options.

When the user selects any one option of the plurality of number of occurrence (numbers) by operating the threshold number setting button 2001, the selected number of occurrence (number) is set as a threshold number.

<Specific Operation>

The automatic screen operation test support apparatus 100 according to the second embodiment executes a processing flow shown in FIG. 21 instead of the processing flow shown in FIG. 11. FIG. 21 is a flowchart showing a processing flow of the non-defect list creation processing executed by the non-defect list creation unit **111*a* of the automatic screen operation test support apparatus 100** according to the second embodiment.

The processing flow shown in FIG. 21 is similar to the processing flow shown FIG. 11 except that step 2105 and step 2110 are added between the step 1170 and the step 1175 in the flowchart shown in FIG. 11. Accordingly, the following description will focus on the different steps 2105 and 2110.

When the non-defect list creation processing proceeds to step 2105, the non-defect list creation unit **111*a* determines whether the threshold number of the number of occurrence of a difference is set. When the threshold number of the number of occurrence of a difference is set, the non-defect list creation unit 111*a* determines "YES" in step 2105 and proceeds the processing flow to step 2110**.

When the non-defect list creation processing proceeds to step 2110, the non-defect list creation unit **111*a* determines whether the number of occurrence 114***i* of a non-defect difference information in the non-defect difference information table 114 related to the scenario executed in step 1110 is equal to or less than the threshold number. Based on the determination result, the non-defect list creation unit 111*a* stores (inputs) “1” in the threshold flag 114*j* of the non-defect difference information indicating that the number of occurrence is equal to or less than the threshold number. Accordingly, the non-defect difference information indicating that the number of occurrence is equal to or less than the threshold number is excluded from the non-defect difference information to be used in the defect difference checking processing (step 1235 in FIG. 12). Thereafter, the non-defect list creation unit 111*a* proceeds the processing flow to step 1175 which is the end point of the processing in the loop 1 and executes the above-described processing.

When the threshold number of the number of occurrence of a difference is not set, the non-defect list creation unit 111*a* determines “NO” in step 2105, proceeds the processing flow to step 1175 which is the end point of the processing in the loop 1, and executes the above-described processing.

<Output Screen>

The non-defect list creation unit 111*a* of the automatic screen operation test support apparatus 100 displays a user confirmation screen 2200 on the display 160 after the non-defect list creation processing. FIG. 22 shows the user confirmation screen 2200. As shown in FIG. 22, the user confirmation screen 2200 includes a threshold determination filter button 2201 and a non-defect difference list table 2202.

The threshold determination filter button 2201 is a button operated by a user to select any one of “all”, “non-defect”, and “exclude” displayed as options.

The non-defect difference list table 2202 includes a determination result button 2203 as information corresponding to an item of threshold determination. The determination result button 2203 is a button operated by a user to select any one of “non-defect” and “exclude” displayed as options. In an initial state after the non-defect list creation processing, when the number of occurrence of a corresponding non-defect difference is larger than the threshold number (when the threshold flag is “0”), the determination result button 2203 is in a state in which “non-defect” is selected and a character “non-defect” is displayed. When the number of occurrence of a corresponding non-defect difference is equal to or less than the threshold number (when the threshold flag is “1”), the determination result button 2203 is in a state in which “exclude” is selected and a character “exclude” is displayed.

When “exclude” is selected in a state in which “non-defect” is displayed, the non-defect list creation unit 111*a* changes a value of the threshold flag 114*j* of non-defect difference information in the non-defect difference information table 114 corresponding to the non-defect difference list from “0” to “1”.

When “non-defect” is selected in a state in which “exclude” is displayed, the non-defect list creation unit 111*a* changes a value of the threshold flag 114*j* of non-defect difference information in the non-defect difference information table 114 corresponding to the non-defect difference list from “1” to “0”.

When “all” is selected by operating the threshold determination filter button 2201, “all of a difference list in which display of the determination result button 2203 is “non-defect” and a difference list in which display of the determination result button 2203 is ‘exclude’” are set as a filter condition. When “non-defect” is selected by operating the threshold determination filter button, “all difference lists in which display of the determination result button 2203 is ‘non-defect’” is selected as a filter condition. When “exclude” is selected by operating the threshold determination filter button, “all difference lists in which display of the determination result button 2203 is ‘exclude’” is selected as a filter condition.

When the threshold determination filter button 2201 is operated, the non-defect list creation unit 111*a* creates the non-defect difference list table 2202 having contents corresponding to the selected condition based on the screen information table 113 and the non-defect difference information table 114, and outputs and displays the non-defect difference list table 2202 on the display 160.

The non-defect difference list table 2202 includes a plurality of non-defect difference lists collected in units of scenarios, and includes, as display of items of information on the non-defect difference lists, a difference occurrence step, coordinates, a content type, a difference type, a difference content (an original content and a content during execution), the number of occurrence, and threshold determination. The non-defect difference list corresponds to one row of the non-defect difference list table 2202. One non-defect difference list displays a content corresponding to one piece of non-defect difference information.

A display mode of information on an item of the number of occurrence (a number indicating the number of occurrence) included in the non-defect difference list table 2202 may be different between a case where the number of occurrence of a non-defect difference list is larger than the threshold number and a case where the number of occurrence of a non-defect difference list is equal to or less than the threshold number. For example, when the number occurrence of a non-defect difference list is larger than the threshold number, a color of a number indicating the number of occurrence may be black, and when the number of occurrence of a non-defect difference list is equal to or less than the threshold number, a color of a number indicating the number of occurrence may be red.

Effects

As described above, the automatic screen operation test support apparatus 100 according to the second embodiment of the invention has the same effects as those in the first embodiment. Further, the automatic screen operation test support apparatus 100 according to the second embodiment can record the number of occurrence of a difference in comparison between differences obtained by executing the automatic screen operation test in the non-defect list creation processing and can register a difference in the non-defect difference list in consideration of the number of occurrence.

Third Embodiment

The automatic screen operation test support apparatus 100 according to a third embodiment of the invention will be described. The automatic screen operation test support apparatus 100 according to the third embodiment differs from the automatic screen operation test support apparatus 100 according to the first embodiment in the following points.

In the defect difference checking processing executed by the defect difference checking unit 111*b*, the automatic screen operation test support apparatus 100 according to the third embodiment specifies, among differences generated in the automatic screen operation test, a difference that has coordinates different from coordinates of a non-defect difference registered in the non-defect difference information table 114, that has the same content type and difference type, and that has a coordinate difference within a threshold as a non-defect difference, among differences that cannot be specified as non-defect differences.

Hereinafter, the different point will be mainly described.

Overview

In the defect difference checking processing, among differences generated in the automatic screen operation test, there may be a difference that may be specified as a non-defect difference among differences that cannot be specified as non-defect differences. For example, a difference whose coordinate value is slightly different from a coordinate value of a non-defect difference information registered in the non-defect difference information table 114 may be specified as a non-defect difference.

In the defect difference checking processing, among differences generated in the automatic screen operation test, when there is a difference that has coordinates different from coordinates of a non-defect difference in the non-defect difference information table 114, that has the same content type and difference type, and that has a coordinate difference within a threshold among differences that cannot be specified as non-defect differences, the automatic screen operation test support apparatus 100 according to the third embodiment specifies the difference that cannot be specified as a non-defect difference as a non-defect difference. Accordingly, the automatic screen operation test support apparatus 100 can improve accuracy of extracting a defect difference.

FIG. 23 is a diagram showing a part of an allowable coordinate setting screen 2300. The allowable coordinate setting screen 2300 includes an x coordinate error setting button 2301 and a y coordinate error setting button 2302. The x coordinate error setting button 2301 is a button operated by a user to select any one of pixel values displayed as options. When the user selects a pixel value by operating the x coordinate error setting button 2301, the selected pixel value is set as an allowable error of an x coordinate value.

The y coordinate error setting button 2302 is a button operated by a user to select any one of pixel values displayed as options. When the user selects a pixel value by operating the y coordinate error setting button 2302, the selected pixel value is set as an allowable error of a y coordinate value.

An overview of the defect difference checking processing will be described using the non-defect difference information table 114 shown in FIG. 24 and the difference information table 115 shown in FIG. 25. FIG. 24 shows an example of the non-defect difference information table 114 created by the non-defect list creation unit 111*a* through the non-defect list creation processing. FIG. 25 shows an example of the difference information table 115 indicating a difference generated as a result of executing the automatic screen operation test by the defect difference checking unit 111*b* in the defect difference checking processing.

In the defect difference checking processing, difference information in the difference information table 115 shown in FIG. 25 is compared with non-defect difference information in the non-defect difference information table 114 shown in FIG. 24.

As a result, attribute information of difference information with an ID 115*a* of 00001 in the difference information table 115 matches attribute information of non-defect difference information with an ID 114*a* of 00004 in the non-defect difference information table 114 except for coordinate information, and a difference between coordinate values of the coordinate information is within an allowable error. Therefore, a value of the defect 115*i* is set to "0" for the difference information with the ID 115*a* of 00001 in the difference information table 115. That is, among differences that cannot be specified as non-defect differences, a difference that is different from a non-defect difference in only a coordinate value and that has a coordinate difference with a non-defect difference within a threshold is specified as a non-defect difference.

Difference information with an ID 00002 in the difference information table 115 does not completely match any non-defect difference information in the non-defect difference information table 114, and attribute information other than a coordinate value does not match either. Therefore, a value of the defect 115*i* is set to "0" for the difference information with the ID 115*a* of 00002 in the difference information table 115. That is, a difference that cannot be identified as a non-defect difference is specified as a defect difference.

Difference information with an ID 00003 in the difference information table 115 completely matches a non-defect difference information with an ID 114*a* of 00004 in the non-defect difference information table 114 (the screen information ID, the coordinates, the content type, and the difference type completely match). Therefore, a value of the defect 115*i* is set to "0" for the difference information with the ID 00003 in the difference information table 115, the ID (identification number) of the matching non-defect difference information is stored in the non-defect difference information ID 115*h*. That is, a difference that can be specified as a non-defect difference is specified as a non-defect difference.

<Specific Operation>

The automatic screen operation test support apparatus 100 according to the third embodiment executes a processing flow shown in FIG. 26 instead of the processing flow shown in FIG. 13. FIG. 26 is a flowchart showing a processing flow of the defect difference checking processing executed by the defect difference checking unit 111*b* of the automatic screen operation test support apparatus 100 according to the third embodiment.

The processing flow shown in FIG. 26 is similar to the processing flow shown in FIG. 13 except that step 2605 is added between step 1300 and step 1305 and step 2610 is added between step 1340 and step 1350 in the flowchart shown in FIG. 13. Accordingly, the following description will focus on the different steps 2605 and 2610.

The defect difference checking unit 111*b* starts the processing from the step 2600 in FIG. 26, proceeds the processing flow to step 2605, and reads an allowable error of coordinate information set by a user. Thereafter, the defect difference checking unit 111*b* executes the processing in step 1305 to step 1335 as described above, then proceeds the processing flow to step 1340, and determines whether the same difference information (non-defect difference information) is present in the non-defect difference information table 114 for the difference (difference information) determined in step 1335.

When the same difference information is present in the non-defect difference information table 114, the defect difference checking unit 111*b* determines "YES" in step 1340, proceeds the processing flow to step 1345, executes the processing in step 1345 described above, and then proceeds the processing flow to step 1355.

When no same difference information is present in the non-defect difference information table 114 for the difference (difference information) determined in step 1335, the defect difference checking unit 111*b* determines "NO" in step 1340 and proceeds the processing flow to step 2610. When the processing flow proceeds to step 2610, the defect difference checking unit 111*b* determines, for the difference (difference information) determined in step s1335, whether a difference (difference information) that has the same content type, whose difference type is coordinate, and that has a coordinate difference within a threshold is present in the non-defect difference information table 114.

For a target difference, when a difference (difference information) that has the same content type, whose difference type is coordinate, and that has a coordinate difference within a threshold is present in the non-defect difference information table 114, the defect difference checking unit 111*b* determines "YES" in step 2610, proceeds the processing flow to step 1345, executes the processing in step 1345 described above, and then proceeds the processing flow to step 1355.

For a target difference, when no difference (difference information) that has the same content type, whose difference type is coordinate, and that has a coordinate difference within a threshold is present in the non-defect difference information table 114, the defect difference checking unit 111*b* determines "NO" in step 2610, proceeds the processing flow to step 1350, executes the processing in step 1350 described above, and then proceeds the processing flow to step 1355.

Effects

As described above, the automatic screen operation test support apparatus 100 according to the third embodiment of the invention has the same effects as those in the first embodiment. Further, in the defect difference checking processing, when a difference that has a coordinate value difference within a threshold is present in the non-defect difference information table 114 among differences that cannot be specified as non-defect differences, the automatic screen operation test support apparatus 100 according to the third embodiment specifies a difference that cannot be specified as a non-defect difference as a non-defect difference. Accordingly, the automatic screen operation test support apparatus 100 according to the third embodiment improves accuracy of extracting a defect difference.

Fourth Embodiment

The automatic screen operation test support apparatus 100 according to a fourth embodiment of the invention will be described. The automatic screen operation test support apparatus 100 according to the fourth embodiment differs from the automatic screen operation test support apparatus 100 according to the second embodiment in the following points.

The automatic screen operation test support apparatus 100 according to the fourth embodiment is configured such that, on a defect difference display screen 2700 (see FIG. 27A) output after the defect difference checking processing, a user can change a result (either a defect difference or a non-defect difference) once determined from a defect difference to a non-defect difference or from a non-defect difference to a defect difference, while checking a content of a difference.

Hereinafter, the different point will be mainly described.

<Output Screen>

FIG. 27A shows the defect difference display screen 2700 after the defect difference checking. After the defect difference checking processing, the defect difference checking unit 111*b* displays the defect difference display screen 2700 on the display 160.

The defect difference display screen 2700 includes a difference filter button 2701, a defect filter button 2702, a user change button 2703, a redisplay button 2704, and a difference list table 2705.

The difference list table 2705 displays a plurality of difference lists collected in units of scenarios, and includes, as display of items of information on the difference list table 2705, a step, a difference, a defect, a content type (not shown), a difference type (not shown), a difference content (an original content and a content during execution)) (not shown), and a user change. The difference list corresponds to one row of the difference list table 2705. One difference list displays a content corresponding to one piece of difference information. The difference list includes a non-defect setting button 2706 as information corresponding to the item of user change. In the difference list table 2705, [estimated] non-defect is displayed for information on an item of defect in a difference list corresponding to a difference that is difficult to be determined as a defect.

For example, for difference information in the difference information table, when non-defect difference information having the same coordinate information, content type, and difference type but different screen information ID is present in the non-defect difference information table 114, [estimated] non-defect is displayed for information on the item of defect in the difference list corresponding to the difference information. For difference information in the difference information table, when the same "non-defect difference information excluded by threshold determination" is present in the non-defect difference information table 114, [estimated] non-defect is displayed for information on the item of defect in the difference list corresponding to the difference information. [Estimated] non-defect is displayed in a display mode (for example, a different color) different from display modes of defect and non-defect.

The difference filter button 2701 and the defect filter button 2702 are buttons having the same functions as the difference filter button 1601 and the defect filter button 1602 in FIG. 16. The user change button 2703 is a button operated by a user to select any one of "all", "non-defect", and "no" displayed as options.

When "all" is selected by operating the user change button 2703, all of a difference list in which display of the non-defect setting button 2706 is 'non-defect' and a difference list in which display of the non-defect setting button 2706 is 'no display'" are set as a filter condition.

When "non-defect" is selected by operating the user change button 2703, "all difference lists in which display of the non-defect setting button 2706 is 'non-defect'" is set as a filter condition. When "no display" is selected by operating the user change button 2703, "all difference lists in which display of the non-defect setting button 2706 is no display" is set as a filter condition.

The defect difference checking unit 111*b* sets a final filter condition with filter conditions set by operating the difference filter button 2701, the defect filter button 2702, and the user change button 2703 as an "AND" condition, includes a difference list corresponding to the final filter condition in the difference list table 2705, and displays the difference list table 2705.

The non-defect setting button 2706 is a button operated by a user to select any one of "non-defect" and "defect" displayed as options. When the user selects "non-defect" by operating the non-defect setting button 2706, information on an item of defect in a corresponding difference list is changed to "non-defect".

When the user selects "defect" by operating the non-defect setting button 2706 for a difference list in which information on the item of defect is "non-defect" or [estimated] non-defect, the information on the item of defect in the corresponding difference list is changed to "defect". Further, the non-defect difference information (a column (a record)) corresponding to the difference list in which the item of defect is changed to defect is deleted from the non-defect difference information table 114.

When the user selects "non-defect" by operating the non-defect setting button 2706 for a difference list in which information on the item of defect is "defect" or [estimated] non-defect, the information on the item of defect in the corresponding difference list is changed to "non-defect".

For example, in FIG. 27A, when "non-defect" is selected for a difference list in which "defect" or [estimated] non-defect indicated by arrows b1, b2, and b3 is displayed, the defect difference checking unit 111*b* updates a value of the defect 115*i* of corresponding difference information in the difference information table 115 to "0". Further, the defect difference checking unit 111*b* changes the display of "defect" or [estimated] non-defect shown in FIG. 27A to display of "non-defect" as indicated by arrows b1, b2, and b3 in FIG. 27B.

Effects

As described above, the automatic screen operation test support apparatus 100 according to the fourth embodiment of the invention has the same effects as the automatic screen operation test support apparatus according to the second embodiment. The automatic screen operation test support apparatus 100 according to the fourth embodiment can change a defect difference to a non-defect difference while a user checks a content of a difference on the defect difference display screen.

Fifth Embodiment

The automatic screen operation test support apparatus 100 according to a fifth embodiment of the invention will be described. The automatic screen operation test support apparatus 100 according to the fifth embodiment differs from the automatic screen operation test support apparatus 100 according to the first embodiment in the following points.

The automatic screen operation test support apparatus 100 according to the fifth embodiment determines an importance level of a difference in the defect difference checking processing so that it is easy to understand a defect difference having a high importance level. The automatic screen operation test support apparatus 100 selects and outputs a defect difference from defect differences according to an importance level.

Hereinafter, the different point will be mainly described.

FIG. 28 is a diagram showing the difference information table 115. The difference information table 115 is similar to the difference information table 115 shown in FIG. 4 except that an importance level 115*j* is added as a column for storing information. Information indicating an importance level of a difference (in the present example, any one of low, medium, and high) is stored in the importance level 115*j*.

FIG. 29 is a diagram showing an importance level table 2900. The importance level table 2900 is information indicating an importance level determination criterion of a defect difference, and is included in the database 112 stored in the storage device 110. As shown in FIG. 29, the importance level table 2900 includes an ID 2901, a content type 2902, a difference type 2903, and an importance level 2904 as columns for storing information (values). In the importance level table 2900, information corresponding to each column related to an importance level of a difference is associated with one another and stored as information (records) in units of rows.

Specifically, the ID 2901 stores an identification number for identifying importance level information indicated by a row (a record) of the table. The content type 2902 stores a content type. The difference type 2903 stores a difference type. The importance level 2904 stores information indicating an importance level (in the present example, any one of low, medium, and high) of the content type and the difference type.

FIG. 30 shows an importance level setting screen 3000 for creating the importance level table 2900. The importance level setting screen 3000 is a GUI screen in a table format, and an input area for inputting information indicating an importance level is provided in each cell. A user can register an importance level of the content type and the difference type in the importance level table 2900 by inputting information indicating the importance level in the input area via an operation device.

<Specific Operation>

The automatic screen operation test support apparatus 100 according to the fifth embodiment executes a processing flow shown in FIG. 31 instead of the processing flow shown in FIG. 13. FIG. 31 is a flowchart showing a processing flow of the defect difference checking processing executed by the defect difference checking unit 111*b* of the automatic screen operation test support apparatus 100 according to the fifth embodiment.

The processing flow shown in FIG. 31 is similar to the processing flow shown in FIG. 13 except that step 1350 in the flowchart shown in FIG. 13 is replaced with step 3110. Accordingly, the following description will focus on the different step 3110.

The defect difference checking unit 111*b* proceeds the processing flow to step 3110, sets the determined difference information as a problematic difference (a defect difference), stores a value of "1" in a column of defect in the difference information table 115, and stores (registers) the difference information in a corresponding row. Further, the defect difference checking unit 111*b* determines an importance level based on the difference information and the importance level table 2900. For example, when a content type of the determined difference information is image and a difference type is size, the defect difference checking unit 111*b* determines an importance level to be corresponding to the image and the size of the importance level table 2900. The defect difference checking unit 111*b* stores the determined importance level in the importance level 115*j* of the difference information table 115. Thereafter, the defect difference checking unit 111*b* proceeds the processing flow to step 1355.

<Output Screen>

FIG. 32 shows a defect difference display screen 3200 after the defect difference checking. After the defect difference checking, the defect difference checking unit 111*b* displays the defect difference display screen 3200 on the display 160. The defect difference display screen 3200 includes an importance level filter button 3201 and a difference list table 3202.

The importance level filter button 3201 is a button operated by a user to select any one of "high", "medium", and "low" displayed as options. When the user selects any one of "high", "medium", and "low" by operating the importance level filter button, "all difference lists including the selected one of 'high', 'medium', and 'low'" are set as a filter condition. The defect difference checking unit 111*b* includes, in the difference list table 3202, a difference list corresponding to the filter condition set by operating the importance level filter button 3201, and displays the difference list table 3202.

Effects

As described above, the automatic screen operation test support apparatus 100 according to the fifth embodiment of the invention has the same effects as those in the first embodiment. The automatic screen operation test support apparatus 100 according to the fifth embodiment can analyze an importance level of a difference based on attribute information of the difference extracted and determined by the defect difference checking processing, select difference information according to the importance level set by the user, and output the difference information to a screen.

Sixth Embodiment

The automatic screen operation test support apparatus 100 according to a sixth embodiment of the invention will be described. The automatic screen operation test support apparatus 100 according to the sixth embodiment differs from the automatic screen operation test support apparatus 100 according to the first embodiment in the following points.

The automatic screen operation test support apparatus 100 according to the sixth embodiment is configured such that a user can set a determination criterion for determining whether differences generated by the automatic screen operation test are the same difference in the non-defect list creation processing.

Hereinafter, the different point will be mainly described.

FIG. 33 is a diagram showing a determination criterion table 3300. The determination criterion table 3300 is included in the database 112 stored in the storage device 110. As shown in FIG. 33, the determination criterion table 3300 includes an ID 3301, a name 3302, and a content 3303 as columns for storing information (values). In the determination criterion table 3300, information corresponding to each column related to a determination criterion for determining whether differences are the same is associated with one another and stored as information (records) in units of rows. Specifically, the ID 3301 stores an identification number for identifying determination criterion information indicated by a row (a record) of the table. The name 3302 stores a name of a determination criterion. The content 3303 stores a content of a determination criterion. For example, "when a difference in coordinate values is less than an allowable value of 5 pixels, differences are regarded as the same" is stored as a content corresponding to a first determination criterion.

FIG. 34 is a view showing a determination criterion input screen 3400. As shown in FIG. 34, the determination criterion input screen 3400 includes a name input field 3401, a determination criterion content input field 3402, and a register button 3403. When the register button 3403 is operated in a state where a name of a determination criterion is input in the name input field 3401 and a content of the determination criterion is input in the determination criterion content input field 3402, the input name and content of the determination criterion are registered in the determination criterion table 3300.

<Specific Operation>

The automatic screen operation test support apparatus 100 according to the sixth embodiment executes a processing flow shown in FIG. 35 instead of the processing flow shown in FIG. 12. FIG. 35 is a flowchart showing a processing flow of the difference information determination and DB registration processing executed by the non-defect list creation unit 111*a* of the automatic screen operation test support apparatus 100 according to the sixth embodiment.

The processing flow shown in FIG. 35 is similar to the processing flow shown in FIG. 12 except that the processing in step 1235 in the flowchart shown in FIG. 12 is replaced with step 3505 and the processing in step 1245 is replaced with step 3510. Accordingly, the following description will focus on the different step 3505.

When the processing proceeds to step 3505, the non-defect list creation unit 111*a* determines whether non-defect difference information the same as that in the difference information table (B) or non-defect difference information satisfying the same determination criterion is present in the non-defect difference information table 114.

When neither non-defect difference information the same as that in the difference information table (B) nor non-defect difference information satisfying the same determination criterion is present in the non-defect difference information table 114, the non-defect list creation unit 111*a* determines "NO" in step 3505, proceeds the processing flow to step 1240, executes the processing in step 1240 as described above, and then proceeds the processing flow to step 3595.

When non-defect difference information the same as that in the difference information table (B) or non-defect difference information satisfying the same determination criterion is present in the non-defect difference information table 114, the non-defect list creation unit 111*a* determines "YES" in step 3505, proceeds the processing flow to step 3510, and adds "1" to a value of the number of occurrence for the registered non-defect difference information the same as that in the difference information table (B) (a row (a record)) or the registered non-defect difference information satisfying the same determination criterion (a row (a record)). Thereafter, the non-defect list creation unit 111*a* proceeds the processing flow to step 3595, and temporarily ends the processing flow.

Effects

As described above, the automatic screen operation test support apparatus 100 according to the sixth embodiment of the invention has the same effects as those in the first embodiment. The automatic screen operation test support apparatus 100 according to the sixth embodiment allows a user to set a determination criterion for determining whether differences generated by the automatic screen operation test are the same difference in the non-defect list creation processing.

Seventh Embodiment

The automatic screen operation test support apparatus 100 according to a seventh embodiment of the invention will be described. The automatic screen operation test support apparatus 100 according to the seventh embodiment differs from the automatic screen operation test support apparatus 100 according to the first embodiment in the following points.

The automatic screen operation test support apparatus 100 according to the seventh embodiment is configured to freely set a determination criterion for determining whether a difference generated by the automatic screen operation test is a non-defect difference in the defect difference checking processing.

Hereinafter, the different point will be mainly described. FIG. 36 is a diagram showing a non-defect difference determination definition table 3600. The non-defect difference determination definition table 3600 is included in the database 112 stored in the storage device 110. As shown in FIG. 36, the non-defect difference determination definition table 3600 includes an ID 3601, a name 3602, and a content 3603 as columns for storing information (values). In the non-defect difference determination definition table 3600, information corresponding to each column related to a determination criterion for determining whether a difference that cannot be specified as a non-defect difference is regarded as a non-defect difference in the non-defect difference checking processing is associated with one another and stored as information (records) in units of rows. Specifically, the ID 3601 stores an identification number for identifying determination criterion information indicated by a row (a record) of the table. The name 3602 stores a name of a determination criterion. The content 3603 stores a content of a corresponding determination criterion. For example, "when a content type of two differences is 'date' and a difference type of two differences is 'format', a format of the contents during execution of the two differences is the same" is stored as a content corresponding to a first determination criterion. "When a content type of two differences is image and a difference type is size, a percentage (%) indicating a difference in sizes between images of the two differences is within a predetermined threshold" is stored as a content corresponding to a second determination criterion. "When a content type of two differences is image and a difference type is color, a difference between RGB values of the two differences is within a predetermined threshold" is stored as a content corresponding to a third determination criterion.

Definitions (contents) of a name and a determination criterion input via the same determination criterion input screen as in FIG. 34 are registered in the non-defect difference determination definition table 3600.

The automatic screen operation test support apparatus 100 according to the seventh embodiment executes a processing flow shown in FIG. 37 instead of the processing flow shown in FIG. 13. FIG. 37 is a flowchart showing a processing flow of the defect difference checking processing executed by the defect difference checking unit 111*b* of the automatic screen operation test support apparatus 100 according to the seventh embodiment.

The processing flow shown in FIG. 37 is similar to the processing flow shown FIG. 13 except that step 3705 is added between step 1300 and step 1305 in the flowchart shown in FIG. 13 and step 3710 is added between step 1340 and step 1350. Accordingly, the following description will focus on the different steps 3705 and 3710, and description of the other steps will be omitted.

The defect difference checking unit 111*b* starts the processing from step 3700 in FIG. 37, proceeds the processing flow to step 3705, and reads a determination criterion set by a user. Thereafter, the defect difference checking unit 111*b* executes the processing in step 1305 to step 1335 as described above, and then proceeds the processing flow to step 1340, and the defect difference checking unit 111*b* determines whether non-defect difference information the same as the difference information determined in step 1335 is present in the non-defect difference information table 114. As described above, the difference information and the non-defect difference information being the same refers to that the screen information ID is the same, the coordinate information is the same, the content type is the same, and the difference type is the same.

When the non-defect difference information the same as the difference information determined in step 1335 is present in the non-defect difference information table 114, the defect difference checking unit 111*b* determines "YES" in step 1340 and proceeds the processing flow to step 3710.

In step 1340, the defect difference checking unit 111*b* determines whether the determined difference information and the non-defect difference information the same as the determined difference information satisfy the determination criterion set by the user. At this time, the defect difference checking unit 111*b* also compares difference contents (contents during execution).

When the determined difference information and the non-defect difference information the same as the determined difference information satisfy the determination criterion set by the user, the defect difference checking unit 111*b* determines "YES" in step 3710, proceeds the processing flow to step 1345, executes the processing in step 1345 as described above, and then proceeds the processing flow to step 1355.

When the determined difference information and the non-defect difference information the same as the determined difference information do not satisfy the determination criterion set by the user, the defect difference checking unit 111*b* determines "NO" in step 3710, proceeds the processing flow to step 1350, executes the processing in step 1350 as described above, and then proceeds the processing flow to step 1355. In this case, since the screen information ID is the same, the coordinate information is the same, the content type is the same, and the difference type is the same, but the difference content does not satisfy an allowable range of the determination criterion, the difference is determined as a defect difference.

Effects

As described above, the automatic screen operation test support apparatus 100 according to the seventh embodiment of the invention has the same effects as those in the first embodiment. In the automatic screen operation test support apparatus 100 according to the seventh embodiment, a user can set a determination criterion for determining whether a difference generated by the automatic screen operation test is the same as a non-defect difference in the non-defect difference information table 114 in the defect difference checking processing. Accordingly, the automatic screen operation test support apparatus 100 according to the seventh embodiment can determine, as a defect difference, a difference whose difference attribute information is the same as and whose content during execution is greatly different from the non-defect difference recorded in difference the non-defect information table 114 in the defect difference checking processing. Therefore, the automatic screen operation test support apparatus 100 according to the seventh embodiment can extract a defect difference with higher accuracy.

Modifications

The invention is not limited to the embodiments described above, and various modifications can be adopted within the scope of the invention. Further, the embodiments described above can be combined with one another without departing from the scope of the invention.

REFERENCE SIGNS LIST

100: automatic screen operation test support apparatus
110: storage device
111: program
111*a*: non-defect list creation unit
111*b*: defect difference checking unit
112: database
113: screen information table
114: non-defect difference information table
115: difference information table
130: CPU
160: display
1500: user confirmation screen
1600: defect difference display screen

The invention claimed is:

1. An automatic screen operation test support apparatus comprising:

an information processing device including a storage device configured to store non-defect difference list data and difference information list data, wherein the information processing device is configured to execute non-defect list creation processing of comparing a first comparison reference screen and a first comparison target screen that are acquired by performing an automatic screen operation on an operation content indicated by a specific scenario for each of a comparison reference screen system and a comparison target screen system for registering the same non-defect difference, thereby executing, a plurality of times, a first automatic screen operation test of extracting a difference generated on the first comparison target screen as compared with the first comparison reference screen, determining the extracted difference, and recording the determined difference in the non-defect difference list data as a non-defect difference, and defect difference checking processing of comparing a second comparison reference screen and a second comparison target screen that are acquired by performing an automatic screen operation on an operation content indicated by a scenario the same as the specific scenario for each of a comparison reference screen system for registering the non-defect difference and a comparison target screen system of a defect extraction target, thereby executing a second automatic screen operation test of extracting a difference generated on the second comparison target screen as compared with the second comparison reference screen, determining the extracted difference, recording the determined difference in the difference information list data, and based on the difference information list data and the non-defect difference list data, specifying, as a non-defect difference, a difference in the difference information list data that is the same as the non-defect difference recorded in the non-defect difference list data and specifying, as a defect difference, a difference in the difference information list data other than the specified non-defect difference.

2. The automatic screen operation test support apparatus according to claim 1, wherein the information processing device is configured to determine difference attribute information including coordinate information, a content type, and a difference type of the difference and record the difference attribute information in the non-defect difference list data in the non-defect list creation processing, and determine difference attribute information including coordinate information, a content type, and a difference type of the difference, record the difference attribute information in the difference information list data, and specify the non-defect difference in the difference information list data based on the difference attribute information recorded in the non-defect difference list data and the difference attribute information recorded in the difference information list data in the defect difference checking processing.

3. The automatic screen operation test support apparatus according to claim 2, wherein the information processing device is configured to record, in the non-defect difference list data, the number of occurrence of the same difference generated when the first automatic screen operation test is executed a plurality of times, and determine whether to record the difference as the non-defect difference in the non-defect difference list data based on the number of occurrence in the non-defect list creation processing.

4. The automatic screen operation test support apparatus according to claim 3, wherein the information processing device is configured to determine whether the same difference occurs based on the difference attribute information in the non-defect list creation processing.

5. The automatic screen operation test support apparatus according to claim 4, wherein the information processing device is configured to record the difference as the non-defect difference in the non-defect difference list data when the number of occurrence is larger than a threshold number, and record the difference as a difference excluded from the non-defect difference in the non-defect difference list data when the number of occurrence is equal to or less than the threshold number in the non-defect list creation processing.

6. The automatic screen operation test support apparatus according to claim 5, further comprising:

an operation device configured to input information to the information processing device when the operation device is operated by a user, wherein the information processing device is configured to set the threshold number based on the information input from the operation device.

7. The automatic screen operation test support apparatus according to claim 4, further comprising:

an operation device configured to input information to the information processing device when the operation device is operated by a user, wherein the information processing device is configured to set, based on the information input from the operation device, a determination criterion for determining whether the same difference occurs in the non-defect list creation processing.

8. The automatic screen operation test support apparatus according to claim 2, wherein the information processing device is configured to specify, as the non-defect difference, a difference satisfying a specific determination criterion among differences that are unable to be specified as the non-defect difference in the difference information list data in the defect difference checking processing.

9. The automatic screen operation test support apparatus according to claim 8, wherein the information processing device is configured to determine, as the difference satisfying the specific determination criterion among the t differences that are unable to be specified as the non-defect difference, a difference of which only the coordinate information of the difference attribute information deviates from that of the difference recorded in the non-defect difference list data and the deviation of the coordinate information is equal to or less than a predetermined threshold, and specify the determined difference as the non-defect difference in the defect difference checking processing.

10. The automatic screen operation test support apparatus according to claim 8, further comprising:

an operation device configured to input information to the information processing device when the operation device is operated by a user, wherein the information processing device is configured to set the specific determination criterion based on the information input from the operation device.

11. The automatic screen operation test support apparatus according to claim 1, further comprising:

a display device configured to display an image; and an operation device configured to input information to the information processing device when the operation device is operated by a user, wherein the information processing device is configured to compare attribute information of a difference that is unable to be specified as a non-defect difference among the differences recorded in the difference information list data with attribute information of the non-defect difference recorded in the non-defect difference list data, and display, on the display device, information indicating a difference, which is difficult to be determined as the non-defect difference, based on a comparison result in the defect difference checking processing, and specify the difference which is difficult to be determined as the non-defect difference as either the defect difference or the non-defect difference based on the information input from the operation device.

12. The automatic screen operation test support apparatus according to claim 1, further comprising a display device configured to display an image, wherein the information processing device is configured to select the defect difference specified from the difference information list data, and display an image including information indicating the selected defect difference on the display device in the defect difference checking processing.

13. The automatic screen operation test support apparatus according to claim 1, further comprising:

a display device configured to display an image, wherein the information processing device is configured to determine an importance level of the extracted defect difference based on attribute information of the defect difference extracted by difference comparison in the second automatic screen operation test and a specific importance level determination criterion, record the importance level in the difference information list data, and display an image including information indicating the importance level on the display device in the defect difference checking processing.

14. The automatic screen operation test support apparatus according to claim 13, further comprising:

an operation device configured to input information to the information processing device when the operation device is operated by a user, wherein the information processing device is configured to set the specific importance level determination criterion based on the information input from the operation device.

15. An automatic screen operation test support method using an information processing device including a storage device configured to store non-defect difference list data and difference information list data, the automatic screen operation test support method comprising:

the information processing device executing non-defect list creation processing of comparing a first comparison reference screen and a first comparison target screen that are acquired by performing an automatic screen operation on an operation content indicated by a specific scenario for each of a comparison reference screen system and a comparison target screen system for registering the same non-defect difference, thereby executing, a plurality of times, a first automatic screen operation test of extracting a difference generated on the first comparison target screen as compared with the first comparison reference screen, determining the extracted difference, and recording the determined difference in the non-defect difference list data as a non-defect difference; and defect difference checking processing of comparing a second comparison reference screen and a second comparison target screen that are acquired by performing an automatic screen operation on an operation content indicated by a scenario the same as the specific scenario for each of a comparison reference screen system for registering the non-defect difference and a comparison target screen system of a defect extraction target, thereby executing a second automatic screen operation test of extracting a difference generated on the second comparison target screen as compared with the second comparison reference screen, determining the extracted difference, recording the determined difference in the difference information list data, and based on the difference information list data and the non-defect difference list data, specifying, as a non-defect difference, a difference in the difference information list data that is the same as the non-defect difference recorded in the non-defect difference list data and specifying, as a defect difference, a difference in the difference information list data other than the specified non-defect difference.

* * * * *